(12) United States Patent
Stanforth et al.

(10) Patent No.: US 8,041,627 B2
(45) Date of Patent: Oct. 18, 2011

(54) SYSTEM AND METHOD FOR IDENTIFYING SPECTRUM WITH TRANSFERABLE ACCESS RIGHTS

(75) Inventors: Peter Stanforth, Winter Springs, FL (US); Larry W. Koos, Sanford, FL (US); William W. Koos, Altamonte Springs, FL (US); Joseph M. Hamilla, Sanford, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 837 days.

(21) Appl. No.: 12/042,626

(22) Filed: Mar. 5, 2008

(65) Prior Publication Data

US 2008/0222020 A1 Sep. 11, 2008

Related U.S. Application Data

(60) Provisional application No. 60/893,221, filed on Mar. 6, 2007, provisional application No. 60/941,863, filed on Jun. 4, 2007.

(51) Int. Cl.
*G06Q 40/00* (2006.01)
*H04W 72/00* (2009.01)

(52) U.S. Cl. ........................ 705/37; 455/452.2

(58) Field of Classification Search .......... 455/450–454; 370/329; 705/37
See application file for complete search history.

(56) References Cited

U.S. PATENT DOCUMENTS

| | | | |
|---|---|---|---|
| 5,608,727 A | 3/1997 | Perreault et al. | |
| 6,954,171 B2 | 10/2005 | Husted et al. | |
| 7,088,997 B1 | 8/2006 | Boehmke | |
| 7,110,756 B2 | 9/2006 | Diener | |
| 7,349,880 B1 | 3/2008 | Kitao | |
| 7,460,837 B2 | 12/2008 | Diener | |
| 2004/0028003 A1 | 2/2004 | Diener et al. | |
| 2004/0087310 A1* | 5/2004 | Williamson et al. | 455/450 |
| 2006/0031082 A1 | 2/2006 | Amaitis et al. | |
| 2006/0083205 A1 | 4/2006 | Buddhikot et al. | |
| 2006/0143111 A1 | 6/2006 | Mylet | |
| 2006/0182169 A1 | 8/2006 | Belge et al. | |
| 2006/0218392 A1 | 9/2006 | Johnston | |
| 2006/0262768 A1 | 11/2006 | Putzolu | |
| 2007/0106596 A1 | 5/2007 | Bayyapu et al. | |
| 2007/0274404 A1 | 11/2007 | Papandriopoulos et al. | |
| 2008/0052387 A1 | 2/2008 | Heinz et al. | |
| 2008/0108365 A1* | 5/2008 | Buddhikot et al. | 455/452.1 |
| 2008/0183634 A1 | 7/2008 | Sadler | |
| 2008/0221951 A1 | 9/2008 | Stanforth et al. | |
| 2008/0222019 A1 | 9/2008 | Stanforth et al. | |

(Continued)

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

(Continued)

*Primary Examiner* — Michael Thier

(74) *Attorney, Agent, or Firm* — Renner, Otto, Boisselle & Sklar, LLP

(57) ABSTRACT

Transferring spectrum use rights may include ascertaining information regarding available spectrum for use in wireless communications. A request for spectrum use from a spectrum user system may be matched with available spectrum. A spectrum certificate may be issued to the spectrum user system, where the spectrum certificate contains at least one spectrum-related variable under which the spectrum user system is to engage in wireless communications.

28 Claims, 9 Drawing Sheets

U.S. PATENT DOCUMENTS

2008/0222021 A1 9/2008 Stanforth et al.
2009/0046625 A1 2/2009 Diener et al.
2009/0197627 A1 8/2009 Kuffner et al.

OTHER PUBLICATIONS

By the Commission, "Second Report and Order, Order on Reconsideration, and Second Further Notice of Proposed Rulemaking", Federal Communications Commission, 2004, FCC 04-167, pp. 1-180.

McKnight, Lee et al., "Best Effort versus Spectrum Markets: Wideband and Wi-Fi versus 3G MVNOs?", pp. 1-18.

Prabhu, Krish et al., "Time for Action" Genuine Ideas, 2002, [retrieved online Feb. 1, 2008], <http://www.genuineideas.com/ArticlesIndex/TimeForAction.htm>.

International Search Report and Written Opinion from corresponding International Application No. PCT/US08/55861.

* cited by examiner

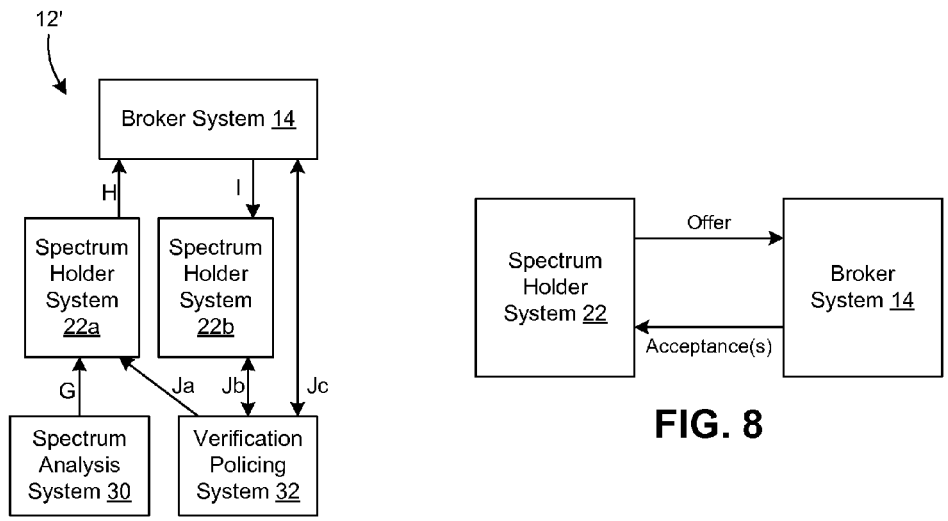
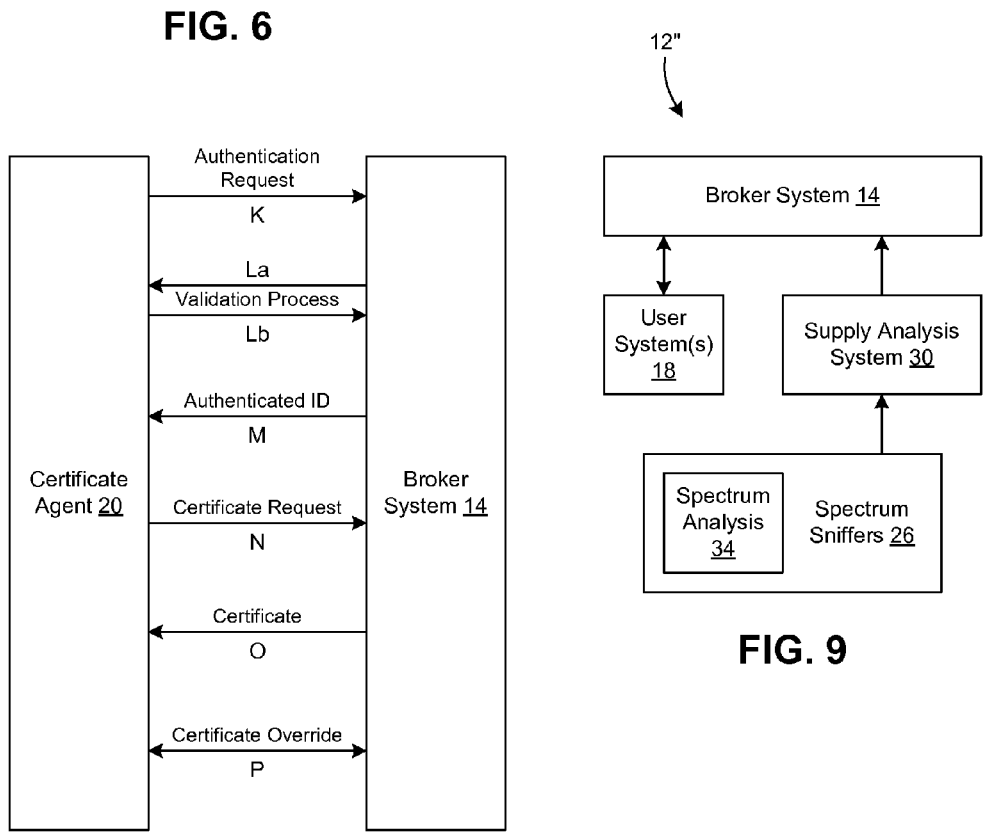

SYSTEM AND METHOD FOR IDENTIFYING SPECTRUM WITH TRANSFERABLE ACCESS RIGHTS

RELATED APPLICATION DATA

This application claims the benefit of U.S. Provisional Patent Application No. 60/893,221 filed Mar. 6, 2007 and U.S. Provisional Patent Application No. 60/941,863 filed Jun. 4, 2007, the disclosures of which are herein incorporated by reference in their entireties.

TECHNICAL FIELD OF THE INVENTION

The technology of the present disclosure relates generally to wireless communications and, more particularly, to a system and method for brokering spectrum among wireless communication systems.

BACKGROUND

The telecommunications industry is in the midst of change due to the rapidly improving cost and performance capability of network components. Early telecommunications systems were highly centralized and provided simple services. Today telecommunications networks (the Internet being an example) are highly distributed, flexible, and provide a variety of services.

Wireless communications continue to gain in popularity, but wireless communications are constrained due to a lack of available, interference free spectrum that may be used for reliable communications within a geographic area. A leading cause of the lack of available spectrum is the manner in which spectrum has been historically allocated. Since the early days of radio and telegraph transmission, the available radio spectrum in the United States and other jurisdictions has been carved up by regulatory agencies into discrete bands or channels. Use of spectrum bands has been restricted to certain types of users or certain licensees. Because many of these bands were allocated at a time when technology was very primitive and data rate requirements were very low, the bands were not allocated in an efficient manner for current demands. It is contemplated that spectrum would be allocated in a much different manner if it were reallocated without regard to current allocations. Also, organizations and enterprises have been granted exclusive use rights for spectrum that they are not utilizing to the spectrum's fullest extent.

In the U.S., for example, the Federal Communications Commission (FCC) licenses spectrum in a primary spectrum market to commission licensees. As an example of current spectrum allocation, FIG. 1 shows a portion of the current U.S. frequency allocations at 2.5 GHz. As can be seen in FIG. 1, plural bands of various frequency ranges have been established and each of these may be allocated to a corresponding commission licensee or reserved for government use. It is noted that regulations specify that stations operating in the 2568-2572 MHz range and the 2614-2618 MHz range are secondary to adjacent channel operations, may not cause interference and must accept interference from other stations.

A secondary market exists for the commission licensees to sub-lease spectrum for use by other parties. Conventional secondary market leases involve the wholesaling of a spectrum holder's spectrum to another party. This is a one party to one party transaction in which use rights for an entire monolithic block of spectrum is transferred.

As a result of this historic allocation and the significant difficulty in re-allocating the spectrum, a number of initiatives have come about in order to try to optimize spectrum use. On May 19, 2003, under FCC order number 03-113, the FCC began an investigation of "smart radios" or "cognitive radios" that could make better use of the spectrum. In 2004 the FCC issued a further order (FCC 04-167) that describes the concept of secondary use of spectrum. That is, a radio user could make use of someone else's spectrum band if the primary license holder is not currently using the spectrum and the radio user could guarantee not to interfere with the primary license holder's operation. However, operation is currently restricted to FCC Part 15 operation in peer-to-peer (P2P) mode, which precludes many valuable service alternatives. A variety of mechanisms have been proposed to allow this secondary use concept to become a reality. These proposals range from databases that describe local use and advise a radio of what spectrum is available, to cognitive radios that can "sniff" out unused spectrum to use.

But there remains significant resistance to these secondary use proposals from current spectrum license holders on two fronts, especially due to the potentially non-deterministic behavior of a cognitive radio. First is the fear that the license holder cannot police the secondary users to ensure there will be no interference. Second is the perception that license holders are "giving away" rights to use a valuable resource, as the license holder's spectrum is a resource that the license holder may have paid millions or even billions of dollars for the right to use.

As such, there remains room for improvement in the manner in which spectrum use rights are temporarily transferred from one party to another.

SUMMARY

To enhance the temporary transfer of spectrum use rights from a spectrum holder to a spectrum user, the present disclosure describes methods and systems for brokering spectrum and policing brokered spectrum. In the disclosed methods and systems, spectrum having use rights held by one or more parties may be disaggregated into plural quantifiable segments, or spectrum commodity items. These segments may be identified by a combination of a time window, a frequency-based spectrum mask, a geography-based spectrum mask and/or a transmitted power limit. The spectrum commodity items may be exchanged on a spectrum market so that spectrum users with a need for spectrum to carry out wireless communications may obtain spectrum, potentially in competition with other spectrum users. The methods and systems address the growing need for spectrum for wireless communication systems by taking advantage of dormant and/or underutilized spectrum. The method and system may overcome the challenges imposed by poor spectrum allocation resulting from the historical manner in which spectrum has been allocated.

The disclosed methods and systems dynamically allocate spectrum to users based on spectrum holder permission and monitoring to unlock the availability of spectrum for both users of spectrum and spectrum holders. The spectrum that is brokered in the disclosed methods and systems may be spectrum in licensed or unlicensed frequency bands. The methods and systems are configured to increase spectrum usage in underutilized frequency bands and to provide self-policing and monitoring of spectrum. The methods and systems allow holders of spectrum to temporarily transfer use of spectrum via an exchange based on time, geographic space and frequency. In one embodiment, a composite system may include a spectrum holder system, a spectrum user system, and a brokerage exchange system.

According to one aspect of the disclosure a method of generating a spectrum commodity item includes analyzing spectrum use data to identify unused or underutilized spectrum for a geographic region; and forming the spectrum commodity item as a function of the identified spectrum, the spectrum commodity item including a time window, a frequency-based spectral mask, a geography-based emission mask and a transmitted power limit that correspond to available spectrum.

According to one embodiment of the method, the spectrum commodity item is disaggregated to meet bandwidth criteria and application criteria of a spectrum user.

According to one embodiment of the method, the spectrum commodity item is aggregated with available spectrum from another spectrum source to meet bandwidth criteria and application criteria of a spectrum user.

According to one embodiment of the method, spectrum associated with the spectrum commodity item is associated with a spectrum holder and forming the spectrum commodity item includes establishing spectrum commodity item components that minimize interference from communication operations of the spectrum holder on a potential spectrum user of the spectrum associated with the spectrum commodity item.

According to one embodiment of the method, the analyzing is carried out predictively to identify spectrum that will be unused or underutilized in the future.

According to one embodiment of the method, the spectrum use data is collected by deployed spectrum sensors in the geographic area.

According to one embodiment of the method, the sensors are deployed by a spectrum holder that has authority to release use of the identified spectrum to another entity.

According to one embodiment of the method, the sensors are deployed by a broker entity that runs an automated spectrum exchange for allocating spectrum certificates that authorize use of spectrum associated with spectrum commodity items.

According to one embodiment of the method, the spectrum use data is collected by radio devices that operate in the geographic area.

According to one embodiment of the method, the spectrum commodity item is generated by a spectrum holder system of a holder that has authority to release use of the identified spectrum to another entity.

According to one embodiment of the method, the spectrum commodity item is generated by a broker entity that runs an automated spectrum exchange for allocating spectrum certificates that authorize use of spectrum commodity items.

According to one embodiment of the method, spectrum associated with the spectrum commodity item is made available to one or more prospective spectrum user systems over an automated spectrum exchange.

According to one embodiment of the method, the spectrum is made available in the form of an offer for which a prospective spectrum user system of the available spectrum places a bid.

According to one embodiment of the method, the offer and the bid are associated with real currency or artificial currency values.

According to one embodiment of the method, the offer and the bid are associated with non-monetary values selected from at least one of priority of spectrum users or spectrum availability.

According to one embodiment of the method, the spectrum associated with the spectrum commodity item is unlicensed spectrum.

According to another aspect of the disclosure, an executable program is stored on a machine readable medium. The program may include logic to analyze spectrum use data to identify unused or underutilized spectrum for a geographic region; and form the spectrum commodity item as a function of the identified spectrum, the spectrum commodity item including a time window, a frequency-based spectral mask, a geography-based emission mask and a transmitted power limit that correspond to available spectrum.

According to one embodiment of the program, the spectrum commodity item is disaggregated to meet bandwidth criteria and application criteria of a spectrum user.

According to one embodiment of the program, the spectrum commodity item is aggregated with available spectrum from another spectrum source to meet bandwidth criteria and application criteria of a spectrum user.

According to one embodiment of the program, spectrum associated with the spectrum commodity item is associated with a spectrum holder and components of the spectrum commodity item are formed to minimize interference from communication operations of the spectrum holder on a potential spectrum user of the spectrum associated with the spectrum commodity item.

According to one embodiment of the program, the spectrum use data is analyzed predictively to identify spectrum that will be unused or underutilized in the future.

According to one embodiment of the program, the spectrum use data is collected by deployed spectrum sensors in the geographic area.

According to one embodiment of the program, the sensors are deployed by a spectrum holder that has authority to release use of the identified spectrum to another entity.

According to one embodiment of the program, the sensors are deployed by a broker entity that runs an automated spectrum exchange for allocating spectrum certificates that authorize use of spectrum associated with spectrum commodity items.

According to one embodiment of the program, the spectrum use data is collected by radio devices that operate in the geographic area.

According to one embodiment of the program, the program is executed by a computer system that is operated by a spectrum holder that has authority to release use of the identified spectrum to another entity.

According to one embodiment of the program, the program is executed by a computer system that is operated by a broker entity that runs an automated spectrum exchange for allocating spectrum certificates that authorize use of spectrum commodity items.

According to one embodiment of the program, spectrum associated with the spectrum commodity item is made available to one or more prospective spectrum user systems over an automated spectrum exchange.

According to one embodiment of the program, the spectrum is made available in the form of an offer for which a prospective spectrum user system of the available spectrum may place a bid.

According to one embodiment of the program, the offer and the bid are associated with real currency or artificial currency values.

According to one embodiment of the program, the offer and the bid are associated with non-monetary values selected from at least one of priority of spectrum users or spectrum availability.

According to one embodiment of the program, the spectrum associated with the spectrum commodity item is unlicensed spectrum.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 6 is a schematic block diagram of another exemplary system for transferring spectrum use rights;

FIG. 7 is a flow diagram of an exemplary protocol between a certificate agent and a broker system of a system for transferring spectrum use rights;

FIG. 8 is a flow diagram of an exemplary protocol between a holder system and a broker system of a system for transferring spectrum use rights;

FIG. 9 is a schematic block diagram of an exemplary system for allocating unlicensed spectrum;

DETAILED DESCRIPTION OF EMBODIMENTS

Figure 1:
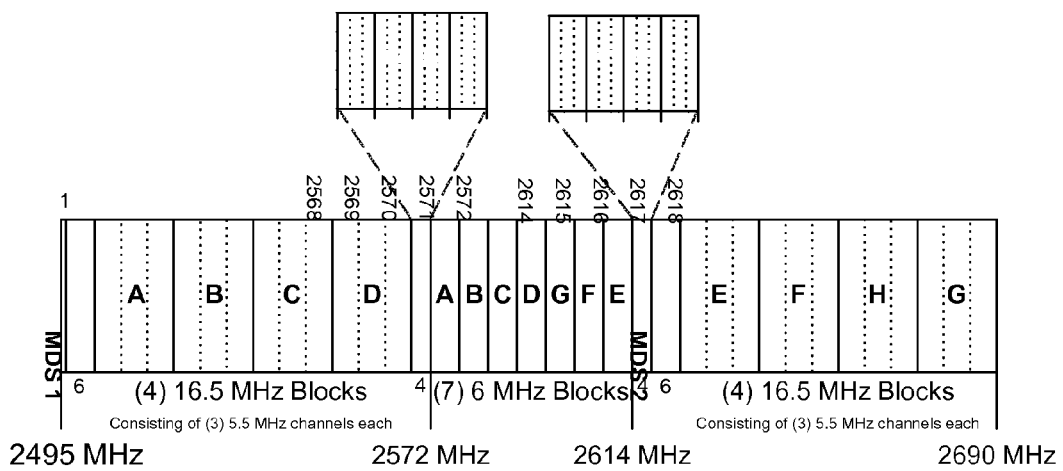
FIG. 1 is a schematic representation of U.S. spectrum allocations at around 2.5 GHz.

Embodiments will now be described with reference to the drawings, wherein like reference numerals are used to refer to like elements throughout. It will be understood that the figures are not necessarily to scale.

A. OVERVIEW

A(1). Parties

In this document, described are various entities that have a relationship to electromagnetic spectrum for use in wireless communications. One entity is a spectrum holder, or simply a holder. A holder is any entity having the authority to release spectrum use to another entity by granting the other entity access to the spectrum. As will be described, the granting of access may be a temporary permission to use spectrum that is associated with the holder. Therefore, the access grant need not be a lease or a sub-lease, as defined by the FCC. The holder may be, but is not limited to, a government or regulatory agency (e.g., in the United States, the FCC), a Commission licensee (e.g., in the United States, an entity that has licensed spectrum directly from the FCC in the primary spectrum market), or a secondary market licensee.

Another entity is a spectrum user, or simply a user. A user is any entity or wireless communications system that has a need for spectrum in order to carry out wireless communications. The user also may be a holder.

Another entity is a spectrum broker. A spectrum broker is any entity that hosts an automated spectrum brokerage as described in greater detail in this document. The spectrum broker may be a holder, a user or a third party. In some instances, the term broker will be used to refer to a device or system that hosts a brokerage function and is not to be confused with an entity that owns or operates the device or system.

In embodiments of some of the methods and systems described in this document, use rights in disaggregated segments of spectrum or aggregated segments of spectrum are transferred from a holder (or holders) to a user by operation of a spectrum brokerage. The user that receives the user rights will typically be a separate entity from the holder of the spectrum, but this need not be the case (e.g., the holder may be the same entity as the user).

A(2). Spectrum Segments

Each segment of spectrum for which access permission may be transferred may be identified by several components and each component is defined by one or more variables. Exemplary components include a time window, a frequency-based spectral mask, a geography-based emission mask and a transmitted power limit. The time window may be a period of time that has a starting point given by a day and time and an ending point given by a day and time. Alternatively, the time window may be a period of time specified by a starting time and a duration. The time window may be as short as second and as long as years.

The frequency-based spectral mask, as is known in the art, may be a mathematically defined set of lines applied to levels of radio transmission. The frequency-based spectral mask is generally intended to reduce interference by limiting excessive radiation at frequencies beyond a certain bandwidth. Spectral masks often include a center frequency and/or a frequency range. Also, spectral masks often include an absolute power component or a relative power component. For an absolute power component, the frequency-based spectral mask may specify that transmission beyond a specified frequency range must be below a specified power value. For a relative power component, the frequency-based spectral mask may specify that transmission beyond a specified frequency range must be below a relative power value as determined by a function, such as a specified power value below the total amount of power being transmitted.

The geography-based emission mask may include a defined geographical boundary that radios operating in accordance with the emission mask may not appreciably transmit beyond. The geographical boundary specified by the geography-based emission mask may be a complex construct that relates to a contiguous or non-contiguous area. The amount of permissible transmission beyond the geographical boundary may be determined in an absolute manner or a relative manner. For an absolute manner, the geography-based emission mask may specify that transmission beyond the boundary must be below a specified power value. For a relative manner, the geography-based emission mask may specify that transmission beyond the boundary must be below a relative power value as determined by a function, such as a specified power value below the total amount of power being transmitted. In one embodiment, the function used for calculating the relative power value may include a distance parameter so that the relative power value may be calculated as a function of distance away from the boundary or other geographical reference.

The geography-based emission mask, alone or in combination with the time window, the frequency-based spectral mask and the transmitted power limit, may be established to control an amount of interference that a user system generates with respect to continued operations of the spectrum holder and/or other users. As will be described below, control over user-generated interference may be balanced with the generation of interference that affects the user.

The transmitted power limit may be a power value that radios operating in accordance with the transmitted power limit may not exceed. The transmitted power limit may be absolute or relative. The transmitted power limit may be independent of the frequency-based spectral mask and/or the geography-based emission mask. The transmitted power limit may be expressed as an average power value (e.g., average total power), a peak power value, or similar value. Exemplary transmitted power limits are 500 milliwatts (mW), one watt (W), 1,000 watts, etc.

Figure 2:
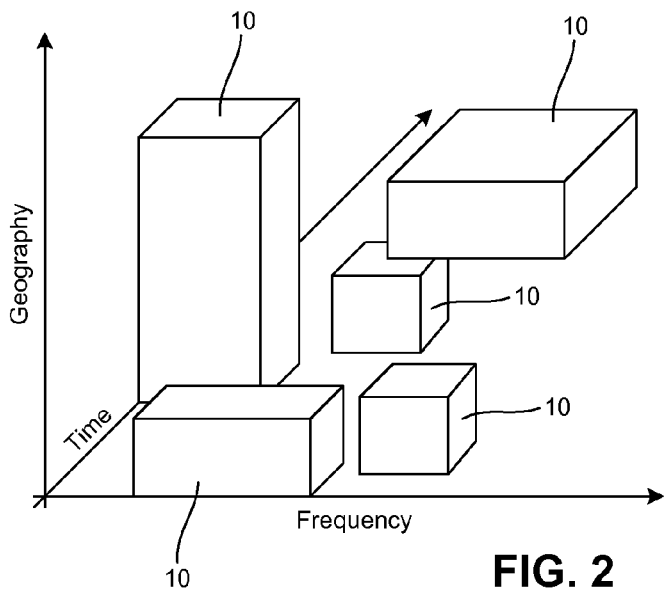
FIG. 2 is a schematic graph of disaggregated blocks of spectrum that each has use rights that may be transferred from a corresponding spectrum holder to a spectrum user.

With additional reference to FIG. 2, the components that identify a block of spectrum (e.g., the time window, the frequency-based spectral mask, the geography-based emission mask and/or the transmitted power limit) may combine to form a spectrum commodity item 10. The graph of FIG. 2 schematically illustrates disaggregated blocks of spectrum in three dimensions, including time, space (or geography) and frequency which may be respectively specified with more particularity by the time window, the geography-based emission mask and the frequency-based spectral mask. Each spectrum commodity item 10 may be associated with use rights that may be transferred from a corresponding spectrum holder to a spectrum user. The spectrum commodity item may have an associated monetary or non-monetary value, or may not be associated with a value.

Spectrum commodity items may be generated by analyzing actual, current spectrum usage and/or predicted, future spectrum usage. Each spectrum commodity item may relate to a definable amount of spectrum from spectrum that is allocated to a holder so as to identify unused or underutilized spectrum that may be made available for use by another entity, or by the holder in a more productive manner. The holder may carry out this analysis or this analysis may be carried out by another entity, such the spectrum broker. Spectrum commodity items may be offered to users that request spectrum usage, such as by bidding on specific commodity items or by submitting a spectrum use request. The brokerage may match offers of spectrum to bids or requests for spectrum. Once matched, the user may be provided with a spectrum certificate. In one embodiment, the spectrum certificate is a data object that forces radio devices of an associated spectrum user system to operate in accordance with spectrum-related components of the spectrum certificate, such as a time window, a frequency-based spectral mask, a geography-based emission mask and a transmitted power limit. Additional details of the transfer of spectrum use rights will be described below in connection with a number of exemplary operational scenarios. Also, aspects of regulating compliance with one or more spectrum certificates that are issued to a user are described below.

A(3). Flexible Spectrum Exchange

Spectrum users are often interested in obtaining access to spectrum for a particular application, such as enterprise applications, two-way communications, point-to-point microwave transmissions, point-to-multipoint communications, cellular communications, mobile broadband communications, and so forth. It will be appreciated that this list is in no way exhaustive of the possible communication applications of potential users. Historically, spectrum users have gained spectrum access for their application(s) by obtaining a license or a secondary market license for spectrum that supports the desired application. In this historical sense, the spectrum associated with the license is defined by a geographical area, a spectral mask, a frequency (or set of frequencies) and one or more service rules. In the U.S., service rules are typically specified under an FCC "Part" number. The service rules under each license refer to an application and/or the type of radio technology that may use the licensed spectrum. While the service rules are typically commensurate with the user's desired application, the licensed spectrum effectively is limited for a stated purpose, although several types of uses may fall within the purpose as governed by the service rules associated with the license.

This historical approach to spectrum licensing raises some issues. For example, some potential spectrum users may not be knowledgeable in the vast array of FCC service rules or other regulatory rules of the U.S. or non-U.S. regulator that govern various wireless communications. Even when the spectrum user is knowledgeable in the rules, navigating the licensing process may be a considerable task. Another issue is that the potential user may not have the understanding of telecommunications principles and technical considerations to seek spectrum access that will support the intended application. For instance, some applications may benefit from "good" in-building penetration and some applications may benefit from a relatively large amount of bandwidth, but these considerations may not be well understood by the user. Even when the spectrum user is knowledgeable in the technical considerations, seeking spectrum that will satisfy the application with a minimum associated licensing cost is a considerable task.

Another issue created by the service rules and/or other regulatory constraints is that a licensee has a limited audience to which the licensee may sub-lease the associated spectrum. That is, the potential secondary market for licensed spectrum is narrowed to users who exactly meet the service rules of other regulatory constraints.

The Applicants have come to appreciate that the historic allocation of spectrum artificially creates constraints on spectrum utilization and the value associated with spectrum. To make more efficient use of spectrum and impart economic value to unused or underutilized spectrum, a holder's spectrum may be deconstructed into spectrum segments that may be used by others. For instance, the above-described spectrum commodity items 10 may be used to initially identify the available spectrum. In one embodiment, the spectrum commodity items 10 make no distinction with respect to service rules or other regulatory considerations that are associated with the holder's spectrum. Therefore, the spectrum commodity items 10, by themselves, impose no restriction on the use of the corresponding spectrum.

The exchange system, as described in greater detail below, may parse the spectrum of the holder along each of the geography-based component, the frequency-based component, and the time-based component. Each of these components may be partitioned in any manner. For instance, spectrum in the same location may be broken into multiple frequency ranges as would best serve the spectrum demands of users. Also, spectrum that overlaps in frequency may be broken up geographically. In other situations, the spectrum may be left as a single frequency range and/or combined with spectrum of another holder to form an aggregate spectrum segment. As another example, spectrum associated with a location and a frequency component may be partitioned in time and then made sequentially available to different users. As such, a holder's available spectrum may become disaggregated and the use rights to the "same" spectrum may be reallocated over and over again. Similarly, spectrum from one or more sources may be aggregated to build a spectrum segment that supports an application of a user.

In this regard, a potential spectrum user that attempts to acquire spectrum use rights through the exchange system may seek sufficient bandwidth in a location for a desired application. This is instead of the conventional practice where users seek spectrum using regulatory rules (e.g., FCC service rules) that dictate specified frequency criteria. The user may specify a time frame in which the spectrum is desired. Therefore, in one embodiment, when matching available spectrum of one or more holders to the spectrum needs of the user, the exchange system does not directly consider FCC or other regulatory constraints that are associated with the user's application (e.g., point-to-point communications, point-to-multipoint communications, peer-to-peer communications, etc.). Rather, available spectrum is viewed as being flexible with respect to the user's intended application. As a practical example, a user may seek spectrum for a mobile video application in a desired location for a desired period of time. Depending on the radio equipment fielded by the user, the user may indicate an acceptable frequency range, such as 2.3 GHz to 2.5 GHz for this example. In some instances, the user need not specify the amount of bandwidth that the user is seeking, but this information can be specified if known to the user. In this manner, the user does not need to know how to obtain a license or secondary market license with service rules or other regulatory rules that match the user's application. Also, the user may have minimal knowledge about the technical considerations for launching the desired application. Rather, the exchange engine may match the user with available spectrum that will accomplish the user's goals. The spectrum, in terms of at least frequency, may change over the time period specified by the user.

To this end, the exchange engine may be an expert system that interprets an application that is specified by the user and interprets any constraints on the available spectrum as set forth by the service and/or regulatory rules that are associated with the available spectrum. For example, in the foregoing example of a mobile video application, the expert system may conclude that the user may be in need of about a one megahertz band of spectrum (or this information may be specified by the user). Once the user's needs are interpreted and the available spectrum is interpreted, the expert system may apply heuristic algorithms to find a match between the user's spectrum need and the spectrum that is available from a holder. In one embodiment, the radio devices employed by the user are certified to operate in accordance with the user's intended application. Therefore, as long as there is a match between certification of the radio devices of the user and available spectrum, access to the holder's spectrum may be granted to the user by the broker system. This matching process may be fundamentally transparent to the user and the holder.

Another factor that the exchange engine may consider is the amount of interference that the user's radio equipment may tolerate when implementing the desired application. This interference may originate from the continued operations of the holder and/or other users. For example, the exchange engine may minimize granting a user access to spectrum of a holder where the user may be located with respect to a transmitter of the holder (or other user) so that the user may experience a potentially detrimental amount of interference, even if the user would not likely interfere with the holder or other users.

Figure 3:
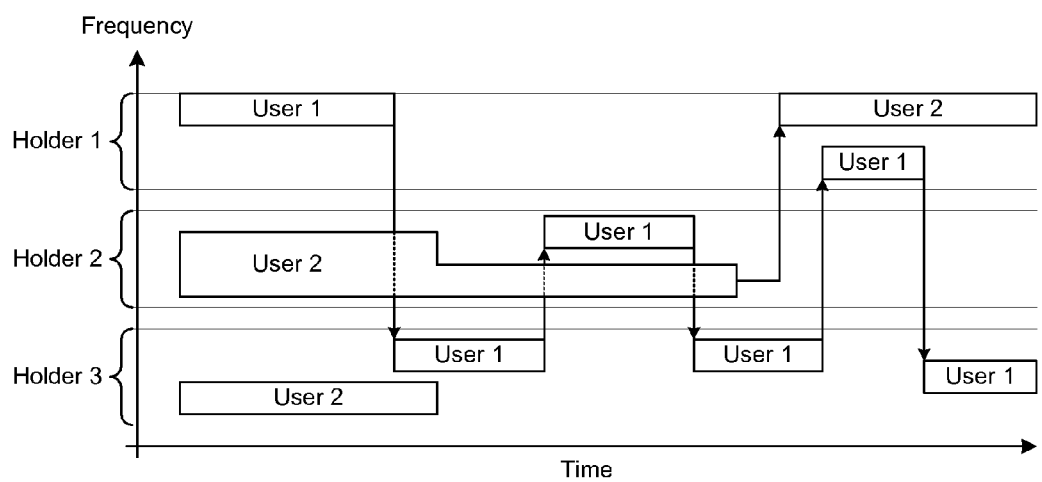
FIG. 3 is a schematic graph representing the grant of spectrum access from exemplary spectrum holders to exemplary spectrum users.

With additional reference to FIG. 3, shown is representative spectrum associated with three holders (labeled holder 1, holder 2 and holder 3) in a hypothetical geographic area. The vertical axis shows relative frequency associated with the spectrum of each holder and the horizontal shows the progression of time. Blocks labeled user 1 show spectrum in the hypothetical location for which a first user has been granted access using the exchange engine. Blocks labeled user 2 show spectrum in the hypothetical geographic area for which a second user has been granted access using the exchange engine.

In the exemplary chart of FIG. 3, user 1 may be the above-described exemplary user seeking spectrum for a mobile video application. The user may have sought continuous spectrum access during the illustrated time period. Depending on time, cost and/or availability, the exchange engine may match the needs of user 1 with spectrum that changes in frequency over time. For example, and as illustrated, user 1 may start with spectrum from holder 1. At a point in time, the access grant to the spectrum from holder 1 may expire and user 1 may be granted access to spectrum from holder 3. As illustrated, this switching process may continue as based on the matching criteria, how long the user desires to operate the application and market forces (e.g., the monetary or non-monetary cost associated with spectrum of various frequencies). In the illustrated example, the user is switched from the spectrum of holder 3 to the spectrum of holder 2, then back to the spectrum of holder 3, then back to spectrum of holder 1 and back again to the spectrum of holder 3. As illustrated, even if a user is switched back to spectrum of a holder from which the user previously had spectrum access, the frequency associated with the two time periods may be different. Overall, the access grants to user 1 are shown as being contiguous in time, but discontinuous in frequency. In the illustrated example, when an access grant to one holder's spectrum expires, the next access grant commences. In other embodiments, the continuous spectrum access may be provided though grants that overlap in time.

In the exemplary chart of FIG. 3, user 2 may be interested in conducting wireless communications in the same or overlapping geographic area as user 1. In the example, user 2 initially has a need for a relatively large amount of bandwidth, which is immediately followed by a smaller bandwidth need. The smaller bandwidth need is, in turn, followed by a period of no need and a subsequent period of the smaller bandwidth need. In the illustrated example, the exchange engine satisfies the bandwidth needs of user 2 by initially aggregating spectrum from holder 2 and holder 3. The subsequent durations, when smaller amounts of bandwidth are needed, are satisfied by granting access to spectrum from holder 2 and then from holder 1. There is a corresponding time gap between these two access grants. Also, it may be observed that the spectrum from holder 1 corresponds to the frequency that user 1 previously had access to.

When granting spectrum access to a user, the user may be issued a spectrum certificate. The spectrum certificate is a data object that the radio devices and/or other components of the user's system based their operation. As described in greater detail below, communications-related information, such as frequency, spectral mask and power limits, may be contained in such a data object. In this manner, the communication equipment of the user is self-regulating to comply with the spectrum access grant and such operation is transparent to the user. For instance, if the frequency with which the equipment is to operate changes, the spectrum certificate may be used to automatically effectuate the change.

As will be more fully described, the broker system matches spectrum availability to spectrum need based on a number of factors, including some or all of geography, service rules and/or other regulatory constraints on the holder's spectrum, user's application, user's radio equipment, bandwidth (inclusive of frequency and spectral mask considerations), power, interference, and price (or other non-monetary consideration). Additional criteria may be evaluated as part of the matching process. For example, the holder may place constraints on the use of spectrum that is granted to another entity. One such constraint may be a non-competition restriction. For instance, a cellular service provider may allow the exchange engine to grant access to the cellular service provider's available spectrum for any application other than a directly competing service.

In addition to carrying out the matching of available spectrum of holders to bandwidth needs of users, the disclosed brokerage exchange encompasses functionality to manage any financial consideration paid for acquiring spectrum access through the exchange. In addition, policing of spectrum usage is managed to regulate compliance with the grant of spectrum access to a user. Policing of spectrum utilization is described below in greater detail. In addition, the exchange itself oversees spectrum transactions to ensure that both the holders and the users are in compliance with any applicable government or regulatory rules. In this manner, the holders can avail spectrum to others and the users can acquire spectrum access without having to be directly concerned with governmental and regulatory compliance.

As a result of disaggregation and/or aggregation of spectrum in the manners described, efficient use of available spectrum may be made and economic (and/or non-economic) value may be gained from brokering spectrum in these manner. Also, even small spectrum segments can be put to use and/or exploited for value. These techniques differ from conventional techniques of seeking spectrum in a secondary market where strict adherence to service and/or regulatory rules determines if a holder's spectrum is suitable for use by a potential user. As such, in the conventional approach, the potential user must be highly involved in seeking out spectrum that matches any service and/or regulatory rules that govern the user's intended application for the spectrum.

The disclosed broker exchange may be used with programmed radio devices and/or opportunistic radio devices, including ultra-wide band (UWB) radios and cognitive radios. While opportunist radio equipment can take advantage of unused spectrum, there is no guarantee of quality of service since the radio equipment must release the spectrum use if the primary user commences communication using the spectrum. If sufficient spectrum is not available, the opportunistic radio equipment may not be able to provide the service expected by the user. In contrast, the disclosed brokerage exchange may transparently assist the user obtain spectrum access in a manner that minimizes quality of service issues, regardless of radio equipment type. In one embodiment, upon issuance of a spectrum certificate to a user so as to grant the user access to associated spectrum, the holder also may be issued a spectrum certificate or other indication of the spectrum access grant so that the holder regulates its spectrum use to avoid interfering with the spectrum now granted to the user.

In sum, the disclosed systems and methods may reduce the transaction time, transaction cost and complexity in temporarily shifting spectrum use rights from a holder to a user. In many instances, the transfer of use rights may be accomplished without invoking a spectrum lease in the primary or secondary markets for spectrum.

The sub-sections that follow are exemplary implementations of transferring use rights in spectrum and/or monitoring use by a recipient of the use rights. Each sub-section describes particular implementations, but it will be understood that each implementation represents an embodiment of the disclosed systems and methods. As such, features that are described and/or illustrated with respect to one sub-section of this document may be used in the same way or in a similar way in one or more other embodiments and/or in combination with or instead of the features of the other embodiments.

In each embodiment, the type or types of radio devices that use the spectrum are not germane to the underlying systems and methods. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

The term "radio circuit" refers to any structural arrangement that implements a stated communication function, and may include dedicated circuit components, firmware, and/or a processor that executes logical instructions. The term "control circuit" refers to any structural arrangement that implements a stated control function, and may include dedicated circuit components, firmware, and/or a processor that executes logical instructions. In one embodiment, functional operations that are described as being implemented in the context of software may be implemented as one or more programs that are stored on computer or machine readable medium and that are executed by a processor that forms part of a control circuit.

B. BROKERING SPECTRUM AMONG WIRELESS DEVICES AND/OR NETWORKS

Figure 4:
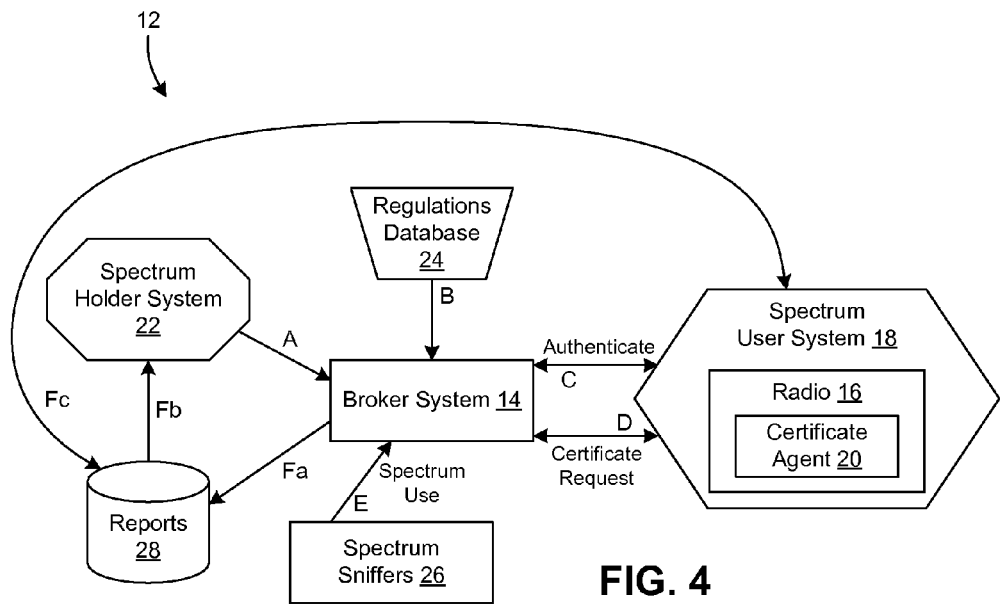
FIG. 4 is a schematic block diagram of an exemplary system for transferring spectrum use rights.

With additional reference to FIG. 4, shown is an exemplary system 12 for transferring spectrum use rights. A spectrum broker component 14 may be used to acquire knowledge of the utilization of spectrum in a given geographic area and is permitted to provide one or more radios 16 of one or more spectrum user systems 18 with a right-to-use certificate (e.g., a spectrum certificate). The mechanism by which the spectrum broker 14 acquires the utilization knowledge is not directly germane to issuance of the right-to-use certificate and may be carried out in any suitable manner, including those described below.

A certificate agent 20 may reside in one or more of the radio devices 16 that utilize spectrum. The certificate agent 20 may be responsible for coordinating the obtaining of a right-to-use certificate from the spectrum broker 14. The right-to-use certificate may be a data object used to bind operation of the radio 16 associated with the certificate agent 20 to specific frequencies and other transmission-related variables specified by the right-to-use certificate. For example, the certificate also may dictate a geographic area in which the certificate is valid and also may dictate a length of time the certificate is valid. Armed with a valid certificate, the radio 16 may be allowed to operate in the spectrum designated by the certificate. The certificate agent 20 may function to ensure that the radio complies with the terms of use. Other entities, such as the broker 14 and/or one or more spectrum analysis devices may police the spectrum to further ensure compliance with the certificate. The mechanisms by which the agent and/or other entities police the radio are not directly germane to issuance of the right-to-use certificate and may be carried out in any suitable manner, including those described below.

In one embodiment, the broker 14 and the agent 20 may communicate using a predetermined protocol based on extensible markup language (XML) or a similar language to describe the constraints and conditions of the certificate.

The system 12 may allow a spectrum holder system 22 to provide the spectrum broker 14 with rules and/or regulations related to secondary use of the spectrum associated with the spectrum holder system 22. The spectrum holder system 22 then may have a reasonably high degree of confidence that the spectrum broker 14 and the certificate agent 20 will comply with the rules and that, if a monetary transaction is involved, financial considerations are addressed.

From this basic arrangement, exemplary embodiments will be described in this sub-section, but other scenarios that fall within the concepts described herein are possible.

The first exemplary embodiment involves the system 12 in which licensed spectrum is utilized and will be described with respect to FIG. 4. The second exemplary embodiment involves the system 12, but operates in unlicensed spectrum and will be described with respect to FIG. 5. A difference between these two embodiments is that, in the first embodiment, all the spectrum (and thus, all the users 14) is controlled and, in the second embodiment, only partial control may be possible because unlicensed, but permissible, user systems 14 may coexist in the specified band along with the user system(s) 14 operating in accordance with the right-to-use certificates.

The broker 14 allows for transactions involving spectrum to be automated. Also, preemption is possible in the system 12. For example, a radio's certificate may be rescinded if a higher priority user desires access to the spectrum. The system 12 provides confidence through policing and provides possible revenue opportunities.

With continued reference to FIG. 4, the spectrum holder system 22 may provide information to the broker 14 regarding the available spectrum and any conditions that may be imposed by the spectrum holder system 22 (arrow A). The broker 14 may already know government or regulatory body regulations (e.g., as defined by the FCC or other entity) that govern the spectrum (arrow B) including, for example, service rules. For instance, the regulations may be stored by a regulations database 24 that is part of or accessible by the broker 14.

Once the spectrum holder system 22 offers or avails spectrum to the broker 14, the broker 14 may, in turn, request to use the spectrum in the same way as any other user that is allocated spectrum directly from the spectrum holder system 22. For instance, the spectrum holder system 22 may issue a certificate to the broker 14. Thus, the broker 14 may know what spectrum is in use and/or is available for use by user systems 18 by virtue of the knowledge of certificates that were issued. The user systems 18 may be or include any communication radio, collection of radios, network or system that uses spectrum authorized under a certificate, and may include, but are not limited to, client devices (e.g., mobile telephones, wireless network interfaces, etc.), base stations, wireless access points, and so forth.

One or more potential user systems 18 may be authenticated and/or validated by the broker 14 (arrow C) prior to being able to request a use certificate from the broker 14 (arrow D). Once authenticated and/or validated, the broker 14 may allocate a spectrum use certificate to one or more of the user systems 18 upon request. The user system 18, which includes the certificate agent 20, may then operate in accordance with the spectrum use certificate provided by the broker 14.

Spectrum sniffers 26 deployed in the service area may provide information about spectrum use and compliance with certificates (arrow E). The broker 14 also may provide information to the spectrum holder system 22 by way of a report 28. The information may include statistical data, data for billing or other uses, and alarms if unauthorized use is detected (arrows Fa and Fb). The user systems 18 also may direct information to the spectrum holder system 22 or vice versa (arrow Fc).

Figure 5:
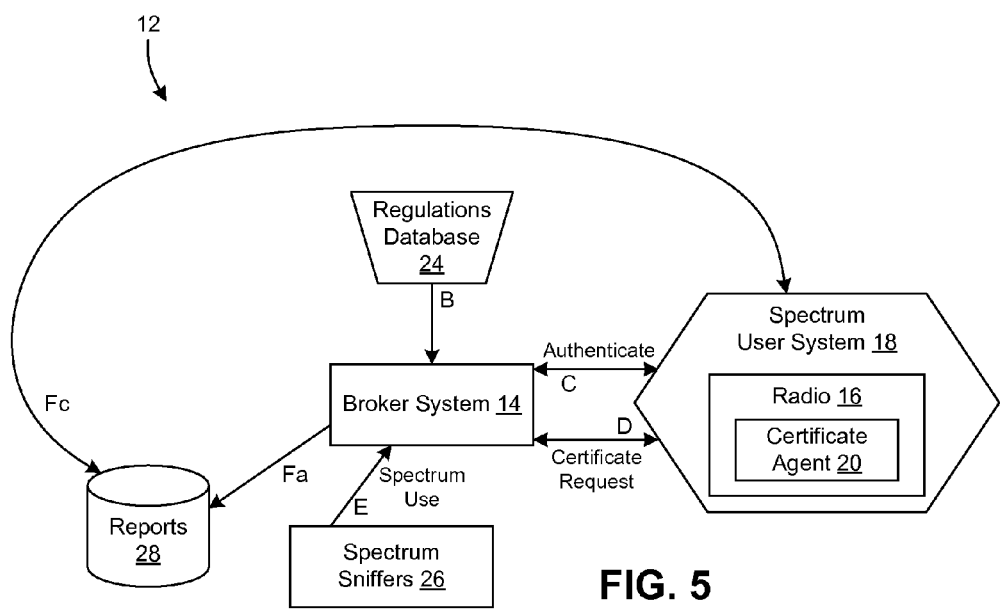
FIG. 5 is a schematic block diagram of another exemplary system for transferring spectrum use rights.

With additional reference to FIG. 5, shown is another embodiment of the exemplary system 12 for transferring spectrum use rights. In the embodiment of FIG. 5, the configuration and operation of the system 12 are similar to the configuration and operation of the system 12 of FIG. 4, but no spectrum holder system 22 is present. Like component reference numbers and arrow designations are used for similar items appearing in both FIGS. 4 and 5.

The broker 12 may be aware of any regulatory constraints on the spectrum (arrow B). Current spectrum current utilization may be reported by spectrum sniffers 26 (arrow E). One or more user systems 18 may be authenticated and/or validated by the broker 14 (arrow C) and, once authenticated/validated, the user(s) 18 may request and receive a spectrum use certificate (arrow D). The certificate may be based on the request, current spectrum use of the user system 18 and/or predicted use of the user system 18, as well as operational requirements of the user system 18. The broker 14 may collect and store data, such as statistical data for monitoring the performance of the system 12 (arrow Fa). Also, data may be provided to the user systems 14 or vice versa (arrow Fc). The data may be stored in the form of one or more reports 18.

For the embodiment of both FIGS. 4 and 5, it will be appreciated that the spectrum holder system 22 (if present), the broker 14, the user systems 18, and the spectrum sniffers 26 may be implemented with any suitable hardware platform. For instance, the spectrum holder system 22 and the broker 14 may respectively include a computing device, such as a server, that executes logical instructions (e.g., software or code) that implement the functions described herein. Thus, the respective hardware platforms may have a memory for storing the software and a processor for executing the software. Such software may be stored in a computer or machine readable medium. Such functionality could also be carried out via dedicated hardware, firmware, software, or combinations thereof. The reports may be formatted any suitable database structure and may be stored by a memory.

C. OBTAINING AND POLICING A SPECTRUM CERTIFICATE

The techniques of brokering spectrum set forth in subsection B, above, may have appeal to spectrum holders and/or spectrum users. As an example, an exemplary spectrum holder may be a cellular carrier that may wish to enter into an arrangement with other spectrum holders with the goal of maximizing spectrum utilization and maximizing value from the collective spectrum. This secondary use may be considered to be different from the secondary use that is currently defined by the FCC in that there is no specific constraint on the use of the spectrum. But this exemplary secondary use arrangement or other secondary use arrangements that may be established using the system 12 may generate concerns by the spectrum holder(s). For instance, a holder may have the perception that the brokering of spectrum may decrease the spectrum's value if the use is not effectively coordinated and controlled. But spectrum holders have fixed operating costs related to their spectrum, whether the spectrum is used or not. Thus, an increase in the utilization of the spectrum by brokering the spectrum has potential to increase the value of the spectrum to the spectrum holder. This sub-section introduces concepts related to the coordination and control of spectrum use.

The radio 16 with certificate agent 20 may form part of a wireless communication network. The radio 16 may be embodied, for example, as a cellular telephone communications point (e.g., cell site), a base station, a wireless access point, a communications device, a network device, or other component. As indicated, any type of radio 16 may include the certificate agent 20. The certificate agent 20 may be configured to ensure that the associated radio 16 abides by rules and regulations that are defined for spectrum.

In one embodiment, the certificate agent 20 may be a logical entity that preferably resides in firmware of the radio. Alternatively, the certificate agent 20 may be executable code or software that is executed by a processor (not shown) of the radio 16. The certificate agent 20 may be associated with a unique equipment identity of the radio 16. The equipment identity is a new construct, but may be similar to a media access control (MAC) address. The unique equipment identity for an associated certificate agent 20 may be recognizable by the broker 14. The certificate agent 20, or aspects of the certificate agent 20, may be encrypted or have other security features to minimize unauthorized modification or cloning.

The broker 14 may be configured to establish a "trust" with the certificate agent 16 in order for the radio 16 (and/or certificate agent 20) to be granted a spectrum certificate. Thus, an action of the certificate agent 20 may be to request authorization and validation by the broker 14. In one embodiment, the relationship between the radio 16 and the broker 14 may be established as part as a spectrum sharing agreement. The trust relationship facilitates an expectation that a trusted agent is to abide by the constraints associated with the certificate. An exemplary mechanism for trust establishment may be a shared secret key. As will be appreciated by one of ordinary skill in the art, other appropriate mechanisms that allow devices to be authenticated and/or validated exist and may be used as part of the trust establishment.

As a precursor to obtaining a spectrum certificate, the certificate agent 20 may have to provide certain information to the broker 14. The information may include, but is not limited to identification of spectral masks that the associated radio 16 can support, identification of protocols the associated radio 16 can support, a current location of the associated radio 16, an antenna configuration and/or power of the associated radio 16, a service request, and a grade of service. The service request may specify parameters such as quality of service (QOS), a duration, etc.

The provided information may be constrained by the capabilities of the radio 16. For example, legacy radios may provide limited options, whereas next generation cognitive radios may provide flexible and/or multiple options. Exemplary options are described in more detail below.

Once authenticated and validated, the radio 16, or the spectrum user system 18 depending on the network topology, may make a spectrum request to the broker 14. In response, the broker 14 may approve or deny the spectrum request. The broker 14 also may be configured to provide an alternative spectral use suggestion to the radio 16.

If the spectrum request is approved, the broker 14 may provide a spectrum certificate that includes, but is not limited to a spectral mask (e.g., the frequency-based spectral mask), duration of the certificate (e.g., the time window), location constraints (e.g., the geography-based emission mask), and a power limit or limits (e.g., the transmitted power limit). The spectral mask may include a center frequency and/or a frequency range, for example.

The broker 14 also may have an additional capability, which is described as an exception handler to allow a higher priority user to preempt a lower priority user. When a certificate is to be preempted by a higher priority user, such as a public safety user or the spectrum holder, the exception handler of the broker 14 may be configured to rescind the certificate.

Spectrum may be provided to the broker 14 by the spectrum holder system 22 in the form of a spectrum offer or as a spectrum commodity item. In this manner, the broker 14 may "acquire" spectrum to offer to user systems 18.

With additional reference to FIG. 6, an exemplary system 12' for transferring spectrum use rights is shown. The components of the exemplary system 12' may form part of the exemplary system 12 of FIG. 4. Accordingly, like component reference numbers are used for similar items appearing in FIGS. 4 and 6. While the illustrated architecture for the system 12' is not the only implementation, it is thought to be relatively efficient.

According to the exemplary system 12' of FIG. 6, a spectrum analysis system 30 may function to provide a first spectrum holder system 22a with information about the utilization of spectrum fragments in terms of time, space (e.g., geography) and frequency (arrow G). The spectrum holder system 22a may use this information to create offers of spectrum fragments to the broker 14 (arrow H) in the form of spectrum commodity items. The broker 14, in turn, may provide spectrum certificates corresponding to the spectrum commodity items to a second spectrum holder system 22b (acting as a user system 18) or some other user system 18 to enable use a corresponding spectrum fragment or fragments (arrow I). The second spectrum holder system 22b may include the certificate agent 20. A verification and policing system 32 may function to monitor that the second spectrum holder system 22b or other user 18 abides by the conditions of the spectrum certificate and provide feedback to the spectrum holders 22 and/or the broker 14 (arrows Ja, Jb and Jc).

With additional reference to FIG. 7, shown is an exemplary protocol between the certificate agent 20 and the broker system 14. As part of the protocol, data, signals and/or messages may be exchanged between the certificate agent 20 and the broker 14. In one embodiment, protocol messages between the certificate agent 20 and the broker 14 conform to a language, which may be, or may be similar to, XML or meta language.

Under the protocol, the certificate agent 20 may be configured to know the identity of the broker 14 and how to locate the broker 14 over a network, such as the Internet or a private network. Knowledge of the identity of the broker 14 and how to locate the broker 14 may be accomplished through normal contractual agreements, such as a spectrum sharing agreement or other mechanisms to provide this information.

The protocol may include and authentication request (arrow K). Once the certificate agent 20 has located the broker 14, the certificate agent 24 may identify itself and initiate an authentication process with an authentication request.

Thereafter, the protocol may include a validation process (arrows La and Lb). Using a known mechanism, such as shared secret key, the broker 14 may authenticate and validate the certificate agent 20.

The protocol may include an authenticated ID (arrow M). For example, the certificate agent 20 may provide an identity value (e.g., the aforementioned equipment identity) to the broker 14 for all or certain communications with the broker 14. The identity value is unique to the radio 20 (or possibly a group of radios 16 of the spectrum user system 18).

The protocol may include a certificate request (arrow N), which may include the above described information provided by the certificate agent 20 to the broker 14. In one embodiment, the certificate request may be in the form of a request for a specific spectrum commodity item, such as bid that includes or does not include a monetary or non-monetary consideration component. The certificate request may take on the form set forth in the following pseudo-code listing 1.

Pseudo-Code Listing 1

```
<Agent-Broker-request>
  <identity>authenticated-identity
  <Query> request for spectrum certificate
  <Spectral-mask-list>{list of spectral masks and center frequencies
  the radio can support}
  <protocol>
  <transmit-characteristics><max transmit power/><antenna
  configuration/> or <geographic footprint>
  <location> gps-coordinates
  <service request> {QOS, Duration, data rate, etc.}
  <bid> price the agent is willing to pay
```

The identity portion of the certificate request may be the same identity that is validated in the authentication process, thereby allowing the broker 14 to know that the certificate agent 20 is to be trusted.

The spectral mask list portion of the certificate request may be a list of the different spectral masks that the radio 16 may adopt and the center frequencies on which it may operate those spectral masks.

The protocol portion of the certificate request may define the type of use the radio 16 will be using, such as carrier sense multiple access (CSMA), time division multiple access (TDMA), orthogonal frequency-division multiplexing (OFDM), etc. Protocol information allows the broker 14 to determine the type and spread of "interference the radio will generate," as well as to potentially police the use of spectrum under the spectrum certificate.

The transmit characteristics portion of the protocol request may describe the power output and transmission pattern of the radio 16 so the broker may gauge the broadcast range of the energy transmitted by the radio 16.

The location portion of the certificate request is the location or locations in which the radio 16 will operate. Alternatively, the location may be described by requesting a geographic footprint.

The service request portion of the certificate request is a request that the spectrum allows for certain user characteristics to be supported, such as QOS and time duration.

The grade of service portion of the certificate request is the identification of the type of user service requested.

The bid portion of the certificate request is a price that the underlying spectrum user is willing to pay for use of the spectrum. The price may be or may not be a financial consideration.

The protocol may include a spectrum certificate (arrow O), which may take on the form set forth in the following pseudo-code listing 2.

Pseudo-Code Listing 2

```
<Broker-Agent-response>
  <Certificate ID> certificate id
  <Duration> time
  <Spectral-mask>spectral mask and center frequencies the radio is
  allowed to operate on
  <transmit-characteristics><max transmit power/><antenna configuration/>
  <location> gps-coordinates
</ Broker-Agent-response >
```

The certificate ID portion of the spectrum certificate may be a time-stamped unique identity that may be uniquely used for the transaction (e.g., this spectrum use certification).

The duration portion of the certificate may be a length of time (from the time-stamped certificate ID) that the certificate is valid and may be set forth in terms of a time window, for example. In one embodiment, the duration is provided in units of time (e.g., seconds or minutes) so that there may not be a need for synchronized clocks between the broker 14 and the certificate agent 20.

The spectral mask and transmit characteristics portions of the certificate may define the transmission parameters for the radio 16 and may be set forth in terms of a frequency-based spectral mask, for example. The transmit characteristics also may include a transmitted power limit, for example.

The location portion of the certificate is a boundary or geographic area within which the certificate is valid and may be set forth in terms of a geography-based emission mask, for example. Should the radio 16 physical stray outside the area defined by the location portion of the certificate or transmit an amount of radiation outside the area defined by the location portion of the certificate, the certificate may become invalid.

The protocol may include a certificate override (arrow P), which may take on the form set forth in the following pseudo-code listing 3.

Pseudo-Code Listing 3

```
<Broker-Agent-Request>
  <Certificate> certificate id
  <rationale> reason(s) for recanting the certificate
```

The rationale portion of the certificate override may be provided for management purposes so that the radio 16 is informed of why the radio 16 is being vacated from the spectrum corresponding to the spectrum certificate.

With additional reference to FIG. 8, shown is an exemplary protocol between the holder system 22 and the broker 14 as part of which the broker 14 may "acquire" spectrum from the spectrum holder system 22 to offer to the user system(s) 18. Spectrum may be made available from a spectrum holder in the form of a spectrum commodity item that may, in turn, form a spectrum offer, as described below. The spectrum holder system 22 may make multiple offers and for multiple durations. In turn, the broker 14 may make these spectrum allocations available to user systems 18 (e.g., the radios 16 of the user systems 18) through the mechanisms described in this document. The broker 14 may provide information back to the holder system 22 about the utilization of the spectrum in the form of one or more acceptance messages. There may be more than one acceptance message for a given spectrum commodity item or associated offer. For instance, if a spectrum commodity item is for several hours, a number of thirty minute spectrum certificates may be issued and each spectrum certificate may have an associated acceptance message.

An offer may take on the form set forth in the following pseudo-code listing 4.

Pseudo-Code Listing 4

```
<Holder-Broker-offer>
<Holder id> holder id, offer id
<Duration> time
<Spectral-mask>spectral mask and center frequencies the radio is
allowed to operate on
<transmit-characteristics><max transmit power/><antenna
configuration/>
<location> gps-coordinates
<ask> value of the spectrum
</ Holder-Broker-offer >
```

Through the offer, the spectrum fragment may be offered in the context of time, space (e.g., geography), and frequency, as well as other operational components.

The holder ID portion of the offer may be the identity of the holder system 22 and may be used to define or determine relevant characteristics from the spectrum sharing agreement.

The duration portion of the offer may be a length of time for which the fragment of spectrum is being made available and may be in the form of a time window, for example.

The spectral mask and transmit characteristics portions of the offer may define the maximum effective isotropic radiated power (EIRP) and the waveforms that may be used in the spectrum fragment and may be in the form of a frequency-based spectrum mask, for example. The transmit characteristics also may include a transmitted power limit, for example.

The location portion of the offer may be the location (e.g., geographic area) in which this spectrum fragment is being made available and may be in the form of a geography-based emission mask, for example.

The ask portion of the offer may be a value, monetary or otherwise, that the underlying spectrum holder places on the offered spectrum fragment.

The acceptance may take on the form set forth in the following pseudo-code listing 5.

Pseudo-Code Listing 5

```
< Broker-Holder-acceptance>
<Holder id> holder id, offer id
<Duration> time
```

Pseudo-Code Listing 5
-continued

```
<value> value of the spectrum
</ Broker-Holder-acceptance >
```

The holder ID/offer ID portions of the acceptance correlate the acceptance back to the original offer. The rest of the data is informational in nature and may include the value derived from the transaction.

While not directly germane to the disclosed systems and methods, a protocol to reconcile any transactions associated with the above-mentioned asks and bids may be added. The protocol may include an arbitrage function to reconcile competing bids and/or asks.

D. OPTIMIZING USE OF UNLICENSED SPECTRUM BANDS IN A SPECTRUM CONSTRAINED ENVIRONMENT

Around the world there are a number of unlicensed radio spectrum bands. In the United States unlicensed bands are known as industrial, scientific and medical (ISM) bands and information infrastructure (UNII) bands. These bands are open to all users provided the users comply with certain regulations. In the U.S., these regulations are known as FCC Part 15. Traditionally, these bands have been used for microwave ovens, cordless phones, low powered wireless remote controls, and similar devices. Recently, with the advent of IEEE 802.11 these bands have become very popular for computer communications and mobile data communications activities, as well as for point-to-point and point-to-multipoint applications. As the number of installations and users of these applications has increased the unlicensed spectrum bands have become very crowded. However, much of the crowding and resulting interference is due to inefficient use and lack of coordination.

Even in this environment, allocation of unlicensed spectrum, as a scarce resource, may be optimized. For example, the spectrum may be more effectively used and more predictably allocated than is conventionally accomplished. In one embodiment, users may be provided with a "licensed" experience in an unlicensed band. The disclosed techniques may have application for a variety of types of users, but may have particular application for industrial and commercial users who lack dedicated spectrum to run various applications. The system and method also may have application for the emerging municipal WiFi market, for example.

With additional reference to FIG. 9, shown is an exemplary system 12" for allocating unlicensed spectrum. The components of the exemplary system 12" may form part of the exemplary system 12 of FIG. 5. Accordingly, like component reference numbers are used for similar items appearing in FIGS. 5 and 9. While the illustrated architecture for the system 12" is not the only implementation, it is thought to be relatively efficient.

The system 12" may include the broker 14, the supply analysis system 30, and a spectrum analysis function 34, each of which may be implemented in software, executable code, firmware, hardware and so forth. In addition, user systems 18 may interface with the broker 14 to acquire spectrum to use.

As in the previously described embodiments, each user system 18 may include one or more radios 16 that use spectrum. These radios 16 may be any communications device or system. One exemplary radio 16 for purposes of description is a network access point or similar type of device. The modulation and frequency of the radios 16 are not directly germane to the technique of allocating unlicensed spectrum, but the radios 16 may operate in the ISM band or UNII band under FCC Part 15, or some other unlicensed band.

The spectrum analysis system 30 may determine, in near real time, the actual utilization of the spectrum in the band(s) of interest (e.g., the ISM and UNII bands). This information may be provided to the supply analysis system 30. The supply analysis system 30 may accumulate the data from the spectrum analysis function 34 and may aggregate the data to provide predictive analysis and signal identification capability. The results of the supply analysis system 30 are provided to the broker 14 in the form of "spectrum offers." The spectrum offers may be a multi-dimensional spectrum information set, including time (e.g. a time window), location (e.g., a geography-based emissions mask), frequency (e.g., a frequency-based spectral mask), and power (e.g., a transmitted power limit). The spectrum offers may take the form of spectrum commodity items.

The broker 14 may use the information from the spectrum offer to provide users with a spectrum fragment (or spectrum fragments) that is available for use.

Because the unlicensed spectrum is freely available for use, a policing function may not form a part of the system. But the spectrum analysis function 34 may observe spectrum use to determine if new users have moved into a spectrum fragment. Thus, some form of cooperation and/or policing function may be of value in a situation where some control over spectrum use may be maintained, such as on a campus or in an industrial complex. In this regard, the illustrated embodiment may relate to an industrial complex, such as a port, a factory or a warehouse, but may have application in a wide variety of other environments, such as a school, a college campus, a military base, a municipality, etc.

The broker 14 may preside over a predetermined geographic area in which the user system(s) 18 may operate. Broker-to-broker interaction to coordinate spectrum use between or among adjacent geographic areas is possible.

The broker 14 serves user system(s) 18 in the geographic area. For instance, the user system(s) may be or may include wireless network access points that may operate in the unlicensed spectrum band(s) of interest, such as the ISM and UNII bands.

The user systems 18 may make requests of the broker 14 (e.g., in a similar fashion to the requests described in the preceding sub-sections) for spectrum that is clear enough of use and/or interference to meet operational expectations or needs of the user system 18. In one embodiment, the user system 18 may be likely to request a 10 MHz or a 20 MHz segment with an FCC Part 15 mask, for example. The broker 14 may use information provided by a supply analysis system 30 to provide the requesting user with a center frequency and spectral mask that may be used at the location of the user system 18. Based on the information from the broker 14, the user system 18 may expect to have predictable service from the spectrum fragment for a length of time specified by the broker 14.

Knowledge of spectrum fragment availability may be generated from the operation of the spectrum analysis function 34 (also referred to as a spectral analysis function) and the supply analysis function 30. Spectrum analysis may be a distributed function. In one embodiment, there may be spectrum sniffers 26 or other types of sensors, including radios 16 of the user system(s) 18, distributed around the geographic area so that a broad and accurate measurement of spectrum use may be obtained.

Spectrum analysis sniffers 26 may be implemented in small, simple, and low cost packages so that many sniffers 26 may be economically distributed around the geographic area. The sniffers 26 may receive operational power from any suitable source, such as batteries, solar power and/or utility power. The sniffers 26 may wirelessly communicate with a host of the supply analysis system 30. Spectral analysis may be directed to real time (or near real time) data collection of spectral occupancy in the bands of interest, but historical data collection may be possible. Spectral analysis may be carried out by measuring power in the band(s) of interest.

The supply analysis system 30 may be centrally hosted. There may still be a many-to-one relationship between the supply analysis system 30 and the broker 14. The supply analysis system 30 may aggregate spectrum occupancy data over time and carry out predictive analysis. Predictive analysis results may be supplied to the broker 14. The predictive analysis may be configured to predict what spectrum fragments may be free at specific times and for how long. The supply analysis system 30 also may carry out a signal identification function and supply signal identification results to the broker 14. The signal identification function may be configured to determine the kinds of devices that are using various spectrum fragments and the modulations that are used.

E. DETAILED SPECTRUM BROKERING IMPLEMENTATION

E(1). System Overview

Figure 10:
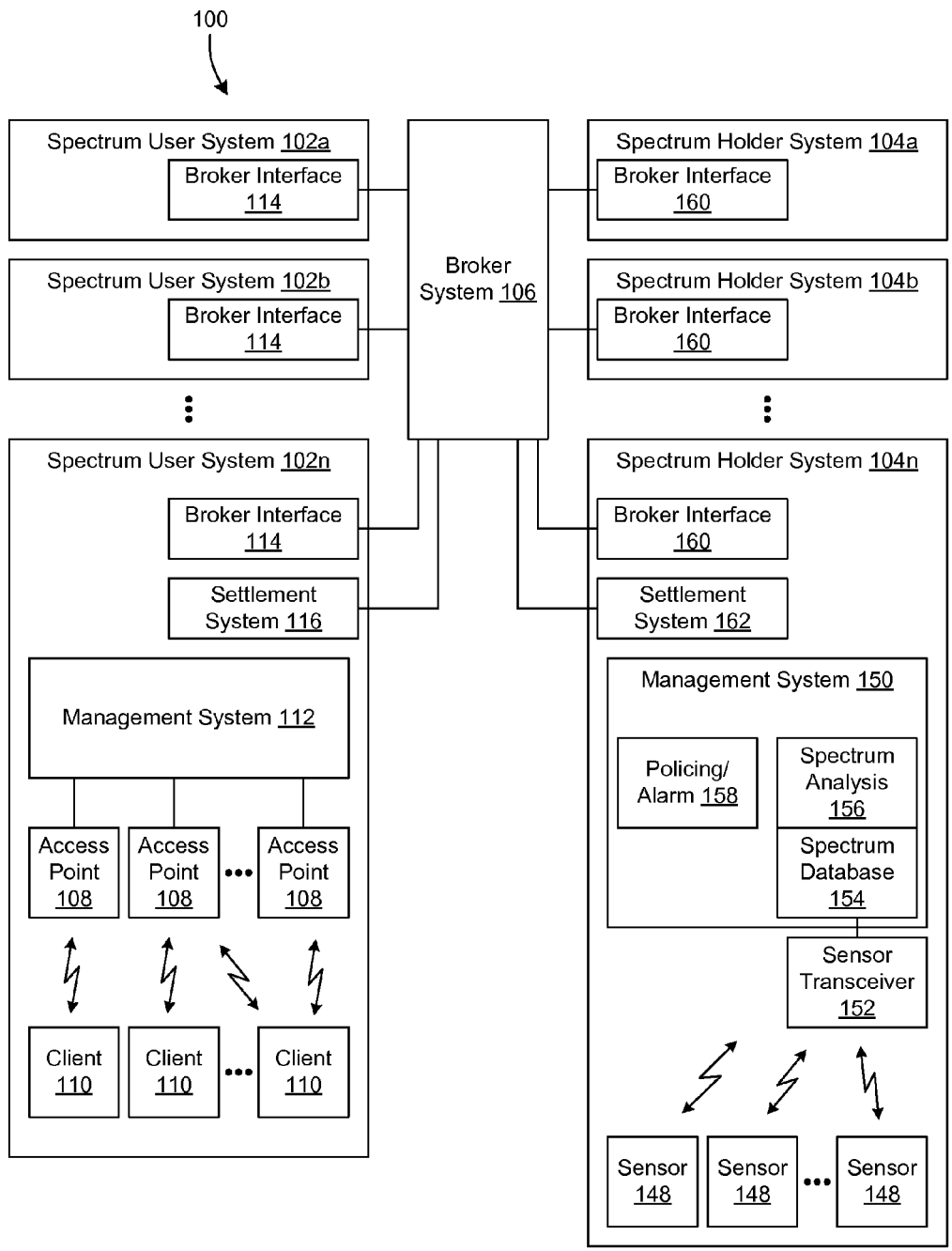
FIG. 10 is a schematic block diagram of an exemplary system for transferring spectrum use rights.

With additional reference to FIG. 10, illustrated is an exemplary system for transferring spectrum use rights and will be referred to as a spectrum brokering system 100. While different reference numerals are used to describe the components of the system 100 and the above-described systems 12, 12' and 12", it will be apparent that there are similarities among these systems. Therefore, components and/or functionality from one of the systems may be used in different systems.

Figure 11:
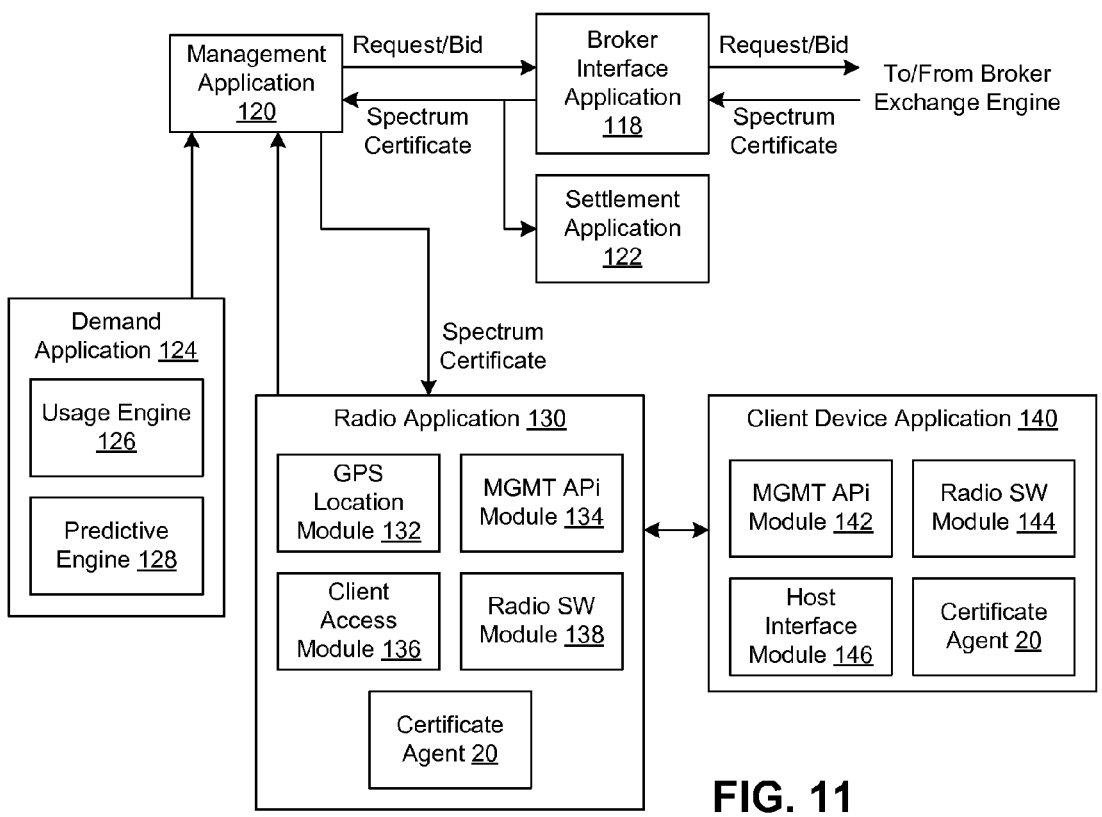
FIG. 11 is a schematic block diagram of a software architecture for a spectrum user system component of the system of FIG. 10.
Figure 12:
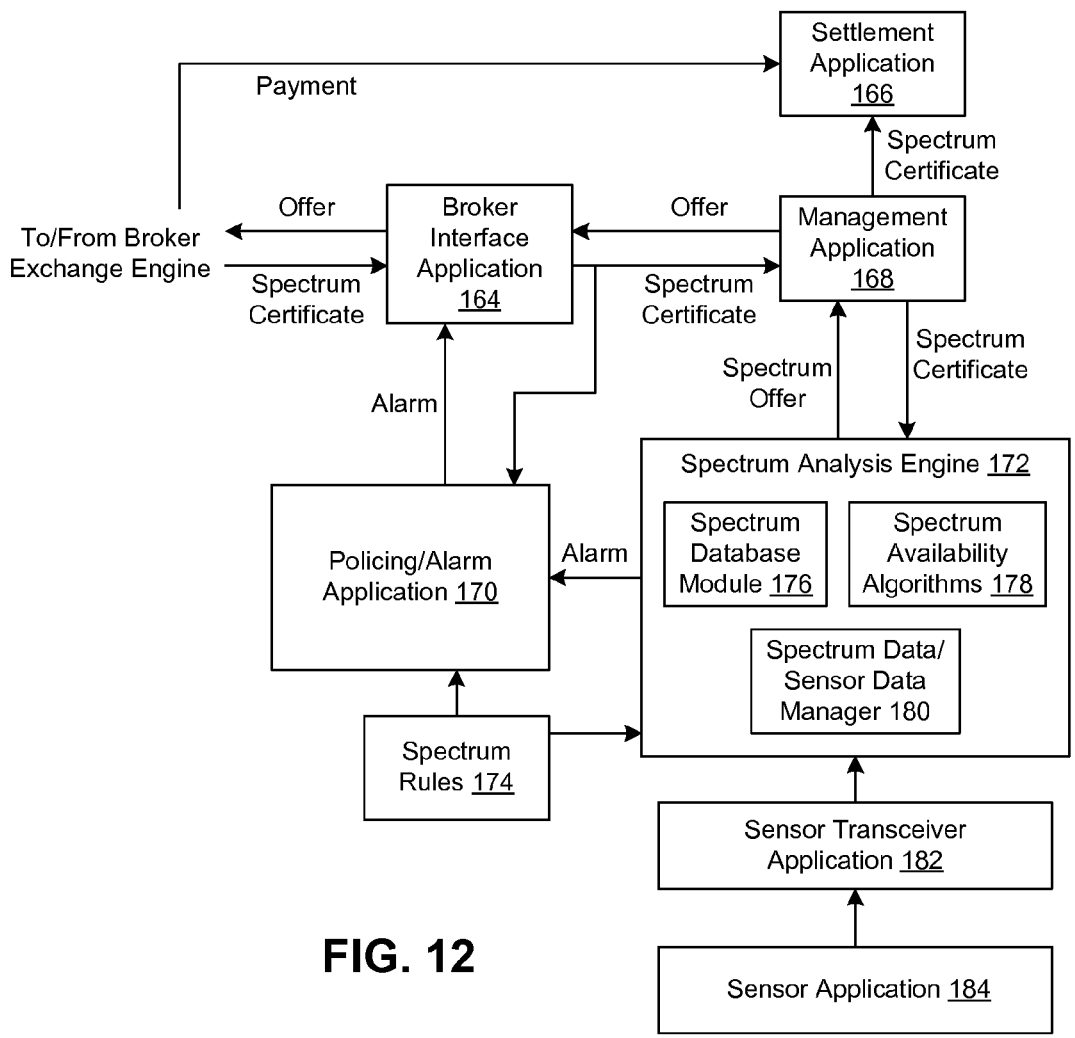
FIG. 12 is a schematic block diagram of a software architecture for a spectrum holder system component of the system of FIG. 10.
Figure 13:
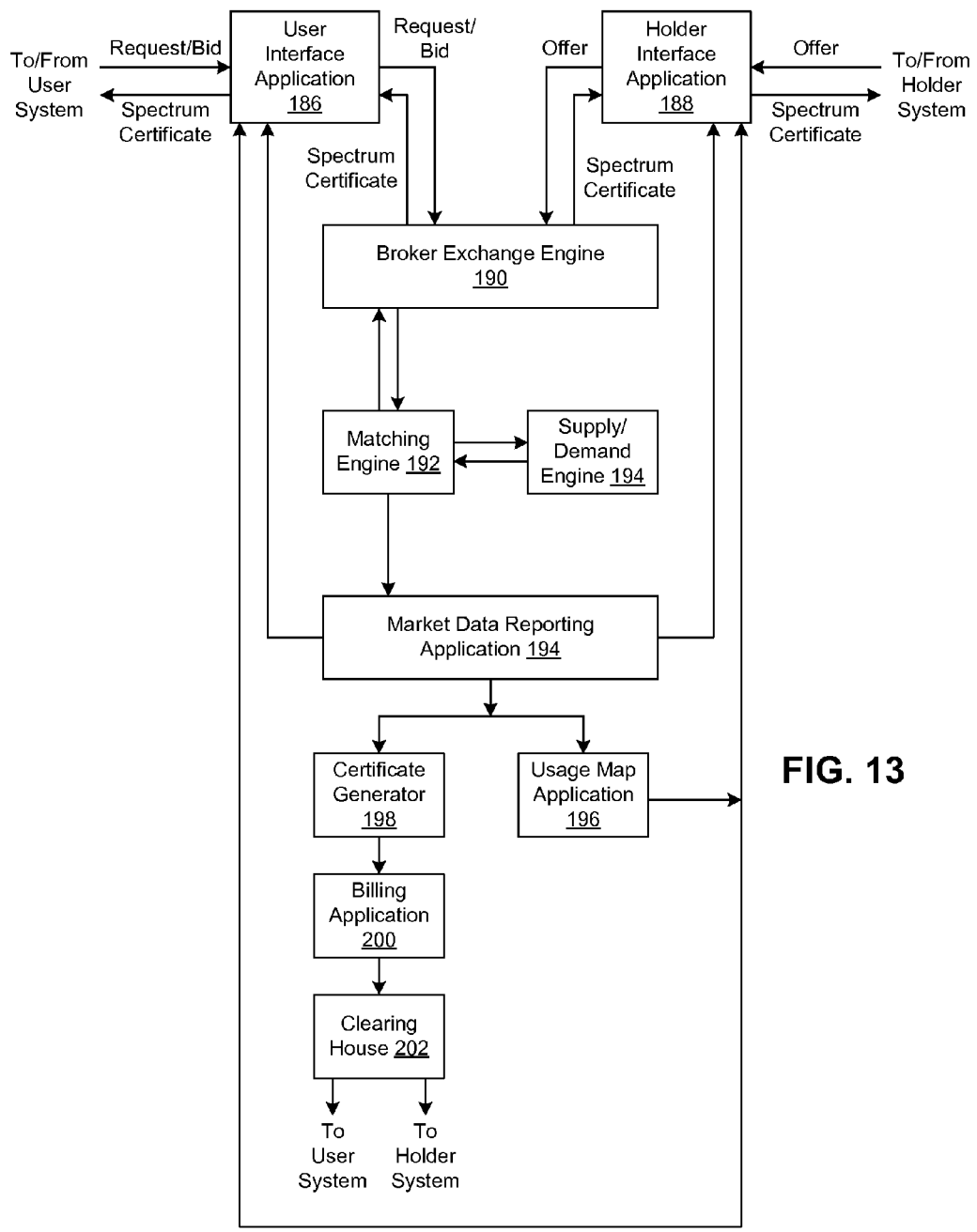
FIG. 13 is a schematic block diagram of a software architecture for a spectrum broker system component of the system of FIG. 10.

The system 100 may include one or more spectrum user systems 102, one or more spectrum holder systems 104, and a spectrum broker system 106. An exemplary software architecture for the spectrum user system 102 is illustrated in FIG. 11, an exemplary software architecture for the spectrum holder system 104 is illustrated in FIG. 12 and an exemplary software architecture for the spectrum broker system 106 is illustrated in FIG. 13.

The system 100 may include, for example, multiple spectrum user systems 102 (e.g., in FIG. 10 there are at least three exemplary spectrum user systems 102, respectively identified by reference numerals 102a, 102b and 102n) and a single spectrum holder system 104. In another embodiment, the system 100 may include a single spectrum user system 102 and multiple spectrum holder systems 104 (e.g., there are at least three exemplary spectrum holder systems 104 in the illustrated embodiment that are respectively identified by reference numerals 104a, 104b and 104n). In another embodiment, the system 100 may include multiple spectrum user systems 102 and multiple spectrum holder systems 104. In embodiments when multiple user and/or holder systems are present, the users and/or the holders may operate concurrently. In another embodiment, there may be one spectrum user system 102 and one spectrum holder system 104. In a special case of the embodiment with one spectrum user system 102 and one spectrum holder system 104, the user associated with the spectrum user system 102 and the holder associated with the spectrum holder system 104 may be the same entity.

E(2). Spectrum User System

In the illustrated embodiment, the spectrum user system 102 is a wireless network with the capability to provide broadband telecommunications between access points 108 and client devices 110 using spectrum that is acquired from a holder(s) (e.g., for licensed spectrum) and/or is allocated to the spectrum user system 12 (e.g., for unlicensed spectrum). The access to this spectrum is for a determined time period, over a specified geographic area, and with a specified frequency and channel bandwidth. It will be appreciated that this type of spectrum user system 102 is merely representative. Other types of spectrum user systems 102 may use the described techniques and, therefore, the radio equipment of the spectrum user systems 102 may be different than the illustrated access points 108 and client devices 110.

The spectrum user system 102 may acquire spectrum for use by "purchasing" spectrum (e.g., acquiring a spectrum access grant) from a spectrum holder via an independent brokerage exchange (e.g., the broker system 106) based on an agreed-upon price or other form of value. The spectrum user system 102 may contain hardware, software applications, and algorithms that make up the network configuration. The spectrum user system 102 manages the spectrum currently in use and the client devices 110 using the network, and may anticipate future spectrum consumption. The spectrum user system 102 may automatically generate requests and/or bids for spectrum and transmit the requests and/or bids to the broker system 106. Bids for spectrum may include a price generated by the spectrum user system 102, or alternatively may be based on non-monetary value.

If a request or bid is matched to available spectrum, a transaction for spectrum use rights between the matched holder system 104 and the user system 102 may occur. As part of settling the transaction, the spectrum user system 102 may be issued a spectrum certificate. The spectrum certificate grants the spectrum user system 102 with access to spectrum under the time, location, frequency and/or power limit agreed upon in the transaction, By controlling at least these criteria, the user system 102 may be considered to have been granted access to spectrum under rules (e.g., government regulations, service rules, regulatory rules and/or holder imposed restrictions) associated with the spectrum. The spectrum user system 102 may monitor itself and vacate the spectrum upon expiration of the time period or if the spectrum user system 102 receives a violation alarm from the broker system 106 (or other system, such as the spectrum holder system 104) for breaking one or more conditions or rules of the transaction. As indicated, the spectrum certificate may include one or more of a time window, a frequency-based spectral mask, a geography-based emission mask and a transmitted power limit.

To implement the above-described transaction and other network functions of the spectrum user system 102, the spectrum user system 102 may include a management system 112 that oversees the access points 108. In addition, the spectrum user system 102 may include a broker interface 114 for interacting with the broker system 106 and a settlement system 116 that manages monetary and/or non-monetary spectrum transactions.

With additional reference to FIG. 11, shown is an exemplary software architecture for the spectrum user system 102. Each software component may be executed by a processor and/or stored by a machine readable medium (e.g., a computer system memory and/or a computer data storage memory). The components may be executed and stored by one computer system or distributed among multiple computer systems.

The software architecture may include a broker interface application 118 that may be executed by and/or stored by the broker interface 114. The broker interface application may transmit requests and/or bids to the broker system 106 and may receive spectrum certificates from the broker system 106. Therefore, the broker interface application 118 may be responsible for request and/or bid processing, spectrum certificate processing and similar processing. The broker interface application 118 also may handle violation alarms, monitor spectrum offers that are posted by the broker system 106 and conduct similar operations. In addition, the broker interface application 118 may include a rules engine for overseeing the placement of requests or bids for spectrum.

The broker interface application 118 may interface with a management application 120 that is executed by and/or stored by the management system 112. In one embodiment, requests and/or bids for spectrum may originate from the management application 120, which are passed to the broker interface application 118. Spectrum certificates that are received by the broker interface application 118 may be forwarded to the management application 120.

In addition, spectrum certificates that are received by the broker interface application 118 may be forwarded to a settlement application 122 that is executed by or stored by the settlement system 116. The settlement application 122 may include a transaction database and may match spectrum certificates to payments to satisfy any monetary or non-monetary consideration that is owed based on the placement of a winning bid for a spectrum commodity item.

The management application 120 may include a demand application 124 that determines a current need for spectrum by the spectrum user system 102 and/or a predicted need for spectrum in the future by the spectrum user system 102. For instance, the demand application 124 may include a usage engine 126 that monitors and determines a current demand for spectrum and that monitors and/or determines a current spectrum supply. In response to spectrum needs, the usage engine 126 may generate a request or bid for spectrum. In addition, the demand application 124 may include a predictive engine 128 that monitors historical usage data, historical constraints on spectrum usage, historical bandwidth availability and other data sets that may be used by the usage engine 126 in predicting future spectrum demand for which the usage engine 126 may generate requests and/or bids for spectrum.

The management application 120 also may coordinate any incoming alarms to a possible violation of one or more spectrum certificates. In response to an alarm, the management application 120 may take remedial action such as discontinue operation under the combination of transmission criteria set forth by the spectrum certificate or modify transmission parameters to comply with the spectrum certificate.

The management application 120 also may include a three-dimensional mapping application to oversee use of spectrum with respect to a geographical area. For instance, the three-dimensional mapping application may maintain global positioning satellite (GPS) data for radio devices operating within the spectrum user system 102. The three-dimensional mapping application may further include collecting and/or maintaining access point 108 radio configuration data, geographic constraint information of spectrum certificates, and time window constraints associated with spectrum certificates.

Received spectrum certificates may be forwarded from the management application 120 to the access points 108 or other radios operating within the spectrum user system 102. More particularly, the spectrum certificates may be passed to certificate agents 20 of the radios operating within the spectrum user system 102 so as to obligate the radios to operate within the constraints specified by the spectrum certificate. It will be appreciated, that the radios may simultaneously operate in accordance with multiple spectrum certificates, or in accordance with at least one spectrum certificate and any additional authorized spectrum (e.g., unlicensed spectrum or spectrum for which the underlying user entity of the spectrum user system 102 is a holder entity).

In one embodiment, the access point 108, or other radio of the spectrum user system 102, executes and/or stores a radio application 130. The radio application 130 may include the certificate agent 20. The radio application 130 may further include a GPS location module 132, a management application programming interface (APi) module 134, a client access module 136 and a radio software module 138. The GPS location module 132 may be responsible for maintaining application data, executing location services and providing NIST conversion, among other functions. The management application programming interface module 134 may function as a simple network management protocol (SNMP) agent, may be responsible for overall configuration, may maintain various hooks including diagnostic hooks, client demand hooks, bandwidth request hooks and over-the-air (OTA) hooks, and other similar functions. The client access module 136 may be responsible for a network application layer. In addition, the client access module 136 may maintain client associations and provide for roaming services. The radio software module 138 may be responsible for radio configurations, media access control (MAC), a link layer and other functions.

The client devices 110, or other radios within the spectrum user system 102, may execute and/or store a client device application 140. The client device application 140 may include a certificate agent 20, as described above in greater detail. The client device application 140 also may include a management APi module 142, a radio software module 144 and a host interface module 146. The management APi module 142 may include an SNMP agent and various hooks such as diagnostic hooks and an OTA configuration hook. The radio software module 144 may be responsible for radio configuration, media access control, a link layer, beacon scan/association, roaming and other functions. The host interface module 146 may be responsible for user interface functions and input/output functions, such as a universal serial bus (USB) interface and any associated drivers.

E(3). Spectrum Holder System

The spectrum holder system 104 allows an associated holder of spectrum to "sell" (e.g., temporarily release spectrum use rights) its spectrum to users for a determined time period, in a specific geographic area, and at a specific frequency and channel bandwidth. The spectrum holder system 104 may include radio frequency (RF) sensors 148 deployed over a geographic area to detect RF energy over a range of frequencies. The data from the sensors 148 are sent over corresponding RF links to a spectrum holder network management system 150 for processing. The spectrum holder system 150 analyzes the data to determine 1) spectrum that is in use, 2) spectrum that is not in use, 3) the location of the used and unused spectrum, 4) the location and frequency of unauthorized user(s), and 5) predicted use of the holder's spectrum. Also, the use or predicted use may be compared with the spectrum rules and guidelines. Further, a determination of other environmental and operational constraints, (e.g., geographic constraints, interference constraints, regulatory constraints, usage constraints, etc.) that impact the use of the spectrum may be made.

In addition to the use of sensors 148 or instead of the use of sensors 148, radio devices operating in the geographic area may report on spectrum usage and provide all or some of the information for policing spectrum use and/or generating spectrum commodity items. As part of this operation, a radio network may be used to determine interference amounts, noise amounts, and other parameters, and to report this information to the management system 150.

In one embodiment, the information collected by the sensors 148 and/or network radio devices may be transmitted to a sensor transceiver 152 that forwards the information to a spectrum database 154 that collects and organizes the information. A spectrum analysis system 156 and/or a policing/alarm system 158 may analyze the information for various operations of the management system 150, including the generation of spectrum commodity items, the generation of offers and/or policing of issued spectrum certificates. In other embodiments, some of all of these operations may be hosted by a different system, such as the broker system 106.

Based on an amount of unused, soon-to-be unused spectrum or predicted-to-be unused spectrum, the spectrum holder system 104 may generate a spectrum availability report. From the information in the report, spectrum commodity items and/or spectrum offers may be generated and communicated to the broker exchange system 106 for trading on the broker exchange system 106. As part of this process, the spectrum holder system 104 may provide an ask price for the available spectrum and the time (e.g., a time window), the location (e.g., a geography-based emission mask), the frequency (e.g., a frequency-based spectral mask) and/or a power component (e.g., a transmitted power limit) of the spectrum along with any guidelines or rules imposed by the spectrum holder system 104.

Upon the matching of the holder's spectrum to spectrum needs of a user, the transaction is logged and, if payment is due, a certificate is received from the broker system 106 for payment from the buyer (e.g., one of the spectrum user systems 102). The holder system 104 also may clear the matched spectrum for use, which may include operating in accordance with a spectrum certificate that is issued back to the spectrum holder system 104 to preclude use of the spectrum for which access has been granted to the spectrum user system 102. This type of spectrum certificate may be internally created by the spectrum holder 104 or created by the broker system 106, and may be referred to as a reverse spectrum certificate. Radio equipment of the spectrum holder system 104 may include a certificate agent 20 to conform communications to the constraints established by the reverse spectrum certificate.

For these purposes, the spectrum holder system 104 may include a broker interface 160 for interacting with the broker system 106 and a transaction settlement system 162. As indicated, the spectrum holder system 104 may include a policing and alarm function that generates an alarm to the broker system 106 and/or the spectrum user system 102 if an unauthorized user or violation of guidelines is detected via the sensors or radio devices, such as unauthorized spectrum use outside the time, location, frequency and/or power limit that the user "purchased." The policing may include self policing of communications activity of the spectrum holder system 104.

With additional reference to FIG. 12, shown is an exemplary system architecture for the spectrum holder system 104. Each software component may be executed by a processor and/or stored by a machine readable medium (e.g., a computer system memory and/or a computer data storage memory). The components may be executed and stored by one computer system or distributed among multiple computer systems.

The broker interface 164 may execute and/or store a broker interface application 164 for interfacing with the broker system 106. For example, offers and/or spectrum commodity items may be transmitted from the broker interface application 164 to the broker system 106. Also, the broker interface application 164 may receive copies of spectrum certificates that are issued to spectrum user systems 102.

The settlement system 162 may execute and/or store a settlement application 166. The settlement application 166 may receive payment information from the broker system 106 or from another source, such as the spectrum user system 102 or a third party.

The broker interface application 164 may manage offers, spectrum commodity items, spectrum certificates, violations and/or alarms, and other information that is exchanged with the broker system 106. In addition, the broker interface application 164 may monitor spectrum bids from spectrum user systems 102 that are posted by the broker system 106. The broker interface application 164 also may be responsible for maintaining a rules engine.

The broker interface application 164 may communicate with a management application 168 that is executed by and/or stored by the management system 150. For instance, the broker interface application 164 may forward spectrum certificates to the management application 168 and receive offers and/or spectrum commodity items from the management application 168 for forwarding to the broker system 106. The broker interface application 164 also may forward spectrum certificates to a policing/alarm application 170 that is executed and/or stored by the policing/alarm system 158. Alarms may be communicated from the policing/alarm application 170 to the broker interface application 164.

The management application 168 may forward spectrum certificates to the settlement application 166 and to a spectrum analysis engine 172. In one embodiment, the spectrum analysis engine 172 also may be executed by and/or stored by the management system 150 or a subcomponent thereof, such as the spectrum analysis system 156. The management application 168 may include a three-dimensional map application for managing GPS data, radio location information, network configuration data, spectrum certificate time data and similar information. The management application 168 also may manage spectrum offers.

The management system 150 may include a spectrum rules database and/or engine 174 that maintains, collects and processes information regarding RF metrics, guard bands, time information and location information. In addition, the spectrum rules database and/or engine 174 may manage rules for spectrum use, including rules established by the spectrum holder system 104 and/or by government regulation. Information from the spectrum rules database and/or engine 174 may be communicated to the policing/alarm application 170, the spectrum analysis engine 172 and any other appropriate component.

The policing/alarm application 170 may include functionality to process rules against data regarding spectrum usage to monitor compliance with spectrum certificates that are issued to one or more of the spectrum user systems 102. The policing/alarm application 170 may further include reporting functions.

The spectrum analysis function 172 may generate spectrum commodity items and/or spectrum offers. To support this function, the spectrum analysis function 172 may include a spectrum database module 176, spectrum availability algorithms 178 and a spectrum data and sensor data manager 180. The spectrum database module 176 may store information regarding historical and current spectrum use and related information for use in the generation of spectrum commodity items and/or spectrum offers. The spectrum availability algorithms 178 may include a usage engine and a predictive engine to analyze spectrum use information as part of the generation of spectrum offers and/or spectrum commodity items. Spectrum offers and/or spectrum commodity items that are generated by the spectrum analysis engine 172 may be forwarded to the management application 168 for further processing and forwarding to the broker interface application 164. The usage engine of the spectrum availability algorithms 178 may analyze current spectrum demand and current spectrum supply to identify spectrum that may be made available for use by user systems 102. The predictive engine of the spectrum availability algorithms 178 may analyze historical usage data, historical spectrum constraints, historical bandwidth availability, and information about known future spectrum usage, for example, to generate a prediction of spectrum that may be available in the future for use by user systems 102. The spectrum data and sensor data manager 180 may monitor power levels, channel size, location information and other information regarding current spectrum use.

The sensor transceiver 152 may execute and/or store a sensor transceiver application 182 that embodies a radio configuration function, power management function and media access control functions, as well as any other functions that may be related to the sensor transceiver 152. In one embodiment, the sensor transceiver 152 may be an ISM transceiver radio.

Each sensor 148 may execute and/or store a sensor application 184 that embodies the functions of the sensor 148. For example, the sensor application 184 may include software that enables a wideband receiver of the sensor 148 to scan spectrum usage. The sensor application 184 may undertake other tasks, such as radio configuration, management processing and data formatting of collected spectrum information, OTA configuration, SNMP management, and so forth.

E(4). Broker Exchange System

The broker system 106 provides an exchange for spectrum holders to "sell" (e.g., temporarily transfer spectrum use rights) spectrum to spectrum users based on a market price (e.g., monetary consideration), other economic consideration, or non-economic benefit or value. The broker system 106 is a real-time exchange that, in one embodiment, matches offers of spectrum from one or more spectrum holder systems 104 to bids for spectrum from one or more spectrum user systems 102. The broker system 102 provides a real-time "book" for holders and users to monitor the spectrum that is available for sale and the current bids and asks for that spectrum. The asks and bids may correspond to spectrum that is currently available or desired, or may correspond to future spectrum usage. An offer may define associated spectrum using a spectrum commodity item.

The broker system 106 may include an expert system that, based on matching rules and heuristic algorithms, matches spectrum needs with available spectrum. Unless restricted by rules generated by the spectrum holder system 104, the matching may include breaking down (disaggregating) spectrum that a holder indicates is available for use by others and/or the matching may involve aggregating spectrum from multiple sources. The matching may be performed to fulfill user spectrum bandwidth needs while minimizing costs to the user and/or maximizing value to the holder. In this regard, the matching rules of the expert system may address the considerations discussed in section A(3) of this document (e.g., regulatory rule compliance, holder-generated rule compliance, user radio equipment capability and/or certification, users intended application, etc.). Also, the matching rules of the expert system may address market forces by matching spectrum demand with available spectrum based on market prices or other market-based value for spectrum, as specified in spectrum bids and offers. Underlying the matching process may be an extraction of data from the components of spectrum commodity items, spectrum offers, spectrum request and/or spectrum bids that are communicated to or are generated by the broker system 106.

The broker system 106 receives offers for the "sale" of spectrum from one or more spectrum holder systems 104 and/or spectrum commodity items from one or more spectrum holder systems 104 and, using a matching engine, may aggregate or partition that spectrum to match the needs of users. The broker system 106 reports market data to holders and users through the book, which is available to all spectrum user systems 102 and spectrum holder systems 104, and shows the bid and ask prices and the spectrum associated with the bid and ask processes. The associated spectrum may be reported in the form a spectrum commodity item or in some other manner that sets forth the location of the available spectrum, the frequency characteristics of the spectrum, the time of availability of the spectrum, the guidelines and rules for the spectrum and any other pertinent information. This information may be used by computer-implemented logic to sell and/or acquire spectrum, and may be made available to human traders or market makers and/or to automated traders or market makers.

When a bid and an offer (or ask) are matched for a determined portion of spectrum, the broker system 106 may log the transaction and may issue a spectrum certificate to each of the spectrum holder system 106 and spectrum user system 102 as a receipt for the transaction. The broker system 106 may then generate a bill and clear the transaction (also referred to as a "sale" or a "trade"). The broker system 106 may generate a real-time usage map based on the issued spectrum certificates and provides this information to both the spectrum user system 102 and the spectrum holder system 106. The usage map may be displayed for observation by a human operator.

The broker system 106 may accept alarms from the spectrum holder system 104 for violations of spectrum use rules and may, in turn, issue an alarm to the spectrum user system 102 (or specific radio device or devices) that caused the violation. The broker system 106 may have the ability to terminate spectrum use rights in the event of a violation as a term or condition of the transaction, and/or impose other sanctions, penalties or fines on the spectrum user. In another embodiment, the broker system 106 may monitor spectrum usage and generate alarms for non-compliance with spectrum certificates.

Referring to FIG. 13, shown is an exemplary software architecture for the broker system 106. Each software component may be executed by a processor and/or stored by a machine readable medium (e.g., a computer system memory and/or a computer data storage memory). The components may be executed and stored by one computer system or distributed among multiple computer systems.

A user interface application 186 may manage communications with the spectrum user systems 102. For example, the user interface application 168 may receive requests for spectrum and/or bids for spectrum from the spectrum user systems 102. Also, the user interface application 186 may transmit spectrum certificates, alarms and any other relevant information to the spectrum user systems 102. Similarly, a holder interface application 188 may coordinate communication with the spectrum holder systems 104. For example the holder interface application 188 may receive offers and/or spectrum commodity items from the spectrum holder systems 104. Also, the holder interface application 188 may receive alarms or other information from the spectrum holder systems 104. The holder interface application 188 may transmit copies of spectrum certificates to the spectrum holder systems 104 and forward other transactional information or data, including payment information, to the spectrum holder systems 104.

The user interface application 186 may forward spectrum requests and/or spectrum bids to a broker exchange engine 190. Also, the holder interface application 188 may forward spectrum offers and/or spectrum commodity items to the broker exchange engine 190. Spectrum certificates may be forwarded to the user interface application 186 and the holder interface application 188.

The broker exchange engine 190 may communicate with or include a variety of sub-modules. For example, a matching engine 192 may include the above-mentioned expert system. The matching engine 192 may use information received from the spectrum user system 102 and the spectrum holder system 104 (e.g., spectrum requests, spectrum bids, spectrum offers and/or spectrum commodity items) to match desired spectrum with available spectrum. The matching engine 193 may directly match spectrum requests and/or spectrum bids with spectrum offers and/or spectrum commodity items. In other embodiments, the matching engine 192 may consolidate multiple spectrum offers and/or spectrum commodity items for matching to one or more spectrum requests and/or spectrum bids. In still other embodiments, the matching engine 192 may partition spectrum requests, spectrum bids, spectrum offers and/or spectrum commodity items to formulate matches between spectrum demand and spectrum availability. These functions may be facilitated by a supply/demand engine 194 that carries out spectrum partitioning and/or spectrum aggregation.

The matching engine 192 may forward information to a market data reporting application 194 that maintains data regarding spectrum demand and spectrum availability. This information may be accessed by the spectrum user systems 102 through the user interface application 186 and by the spectrum holder systems 104 through the holder interface application 188. The information may be maintained as a book of spectrum offers and a book of spectrum bids, for example. The market data also may be reported to a usage map application 196. The usage map application 196 may use geographical information associated with the market data to map out spectrum demand and/or spectrum availability. This information may be made available to the spectrum user systems 102 through the user interface application 186 and the spectrum holder systems 104 through the holder interface application 188.

When matches between spectrum demand and spectrum availability are made by the matching engine 192, information about the matches may be passed to a certificate generator 198. This information may be passed to the certificate generator 198 through the market data reporting application 194. The certificate generator 198 may be responsible for generating spectrum certificates. As indicated, each spectrum certificate may identify spectrum that may be used by the spectrum user system 102 by various constraints related to, for example, time, location, frequency, RF metrics and so forth. For instance, the spectrum certificate may include a time window, a frequency-based spectral mask, a geography-based emission mask and a transmitted power limit.

Information regarding any matches may be communicated to a billing application 200 that maintains a transaction database of spectrum certificates and price history information. The billing application 200 may forward information regarding current matches to a clearing house 202 that maintains receivables and payables for the spectrum holder system 104 and the spectrum user system 102. Data generated by the certificate generator 198, the billing application 200 and the clearing house 202 may be provided to the spectrum user system 102 and/or the spectrum holder system 104 respectively through the user interface application 186 and the holder interface application 188.

E(5). Example System Environment

Secondary Use for Backhaul

Most wireless networks are wireless in the sense that a client device access portion of the network is wireless. Examples of such networks include a WiFi network (e.g., a network based on the IEEE 802.11 standard) and a WiMax network (e.g., a network based on the IEEE 802.16 standard). But the backhaul portion of the network may be implemented in a wired technology, such as a T1/E1 service, a cable modem system, or a fiber optic ring. In many instances, installing a wired network backhaul may involve considerable effort, financial investment, resources and environmental impact. For example, installing a wired network backhaul may involve digging a trench in the ground to add wired capacity. Also, WiFi and WiMax networks may best operate with backhaul speeds greater than 10 megabits per second (Mbps) capacity, which T1/E1 services and cable modem systems may not be able to provide.

Some networks may have a wireless backhaul that is implemented using a spectrum allocation above 10 gigahertz (GHz). In the United States, this spectrum was some of the earliest spectrum auctioned by the FCC in an attempt to create revenue. The early auction winners paid large sums for the spectrum allocation, but failed to build a business that justifies the investment. As a result, most of the spectrum in this range went through a bankruptcy process and was distributed across a large number of holders. Today, the spectrum is distributed to the extent that no single spectrum holder has sufficient spectrum resources to deploy a nationwide backhaul network. It is contemplated that similar issues may be present in locations outside the United States.

The above-described system 100 (or the systems 12, 12' or 12") may be used to aggregate sufficient spectrum to establish a wireless backhaul network of a desired geographic size. Spectrum from multiple holders may be aggregated for use by one user and/or the spectrum from multiple holders may be allocated across multiple networks.

As an example, a first spectrum holder (referred to as spectrum holder A) may have excess capacity in a first city (e.g., Dallas, Tex.), but not enough spectrum in a second city (e.g., Boston, Mass.). A second spectrum holder (referred to as spectrum holder B) may have the opposite spectrum capacity. The broker system may allow the holders to obtain and/or provide spectrum (e.g., lease spectrum in a secondary use arrangement) so that there is sufficient spectrum supply in each market to meet spectrum demand. In one embodiment, spectrum holder A may provide spectrum in Dallas to spectrum holder B in exchange for financial consideration or for spectrum in Boston. In another embodiment, a third-party that lacks spectrum in Dallas, Boston or both may provide service by leasing spectrum from both holders A and B, whom together have spare capacity in those cities.

It will also be apparent that the brokerage arrangement may allow for spectrum that was not originally licensed for backhaul services to be made available on a secondary basis to an entity or entities that wish to provide backhaul services.

E(6). Example System Environment

Spectrum Optimization in Shared Backhaul/Access Implementation

As indicated, wireless access networks are presently being fielded. For instance, a municipal wireless access network may be implemented on a technology platform, such as WiFi or WiMax. In order to achieve high user throughput, the network may include a relatively large number of base stations and/or access points compared to a traditional cellular system. To be efficient, each base station may be in operative communication with a core network using some form of backhaul that operates at a data rate that is not easily supplied by T1/E1 or cable modem connections. As further indicated, a wireless backhaul may be employed to gain higher throughput for the backhaul.

In conventional networks that use a wireless backhaul and wireless access, partitioning of spectrum between backhaul and access is performed in a pseudo-static manner using RF planning tools and techniques. Under these techniques, spectrum is allocated when the network is deployed and only is changed as service demand changes. Unfortunately, service demand is continually changing and the RF planning tools and techniques are unable to keep up with the pace of change.

The spectrum brokering system 100 and/or one of the systems 12, 12' or 12" may be used to partition spectrum in a real-time manner. The sensors 148 (e.g., spectrum sniffers), radio devices in the system 100 and spectrum analysis may be used to detect spectrum bands that are underutilized and report when the underutilized spectrum is available. Base stations and access points that could improve service to client devices with additional spectrum resources may request additional spectrum from the broker system 106 or higher-level components in the spectrum user system 102. As existing certificates expire, available resources may be reallocated across the network in an efficient manner and/or additional spectrum may be acquired through the broker exchange system 106. During this process, economic and/or non-economic market forces may drive the brokering system.

In this system environment, a wireless network service provider may share its spectrum resources across two parts of the network (e.g., including access and backhaul). The relative economic value of the two portions may be determined by the network service provider and use these factors as an input into the manner in which bids and asks are placed. One way to implement the analysis performed within a spectrum user system is to create an artificial currency and a finite-sized currency pool. Some of the currency pool may be allocated to the access portion of the network and some of the currency pool may be allocated to the backhaul portion of the network. Then, using the finite portions of the currency pool, spectrum may be acquired for access operations and for backhaul operations. In this manner, a resource constraint issue may be addressed under a free market technique rather than by using a traditional spectrum allocation methodology that is based on performance driven optimization.

Other competing interests for spectrum may be managed in a similar manner. For instance, two spectrum user systems 102 that desired to use overlapping spectrum for network access may use artificial currency from a finite-sized currency pool to allocate spectrum between the two systems 102. As a specific example, two branches of the military (e.g., the Navy and the Army) may compete for spectrum resources using artificial currency.

E(7). Example System Environment

Aggregation of Spectrum

In this exemplary system environment, spectrum that is independently held (e.g., licensed) is aggregated into a contiguous portion of spectrum to improve value and reduce idle time.

Much of the radio spectrum that has been allocated under historical approaches has been allocated in relatively small frequency bands, especially in the ultra-high frequency (UHF) and very-high frequency (VHF) portions of the spectrum. The bands are typically wide enough for services such as push-to-talk or voice communications, but other networking and data communication applications (e.g., multimedia services) cannot be effectively accommodated in these narrow allocations. In addition, the allocated bands have limited capacity, meaning that if the bands are fully utilized, additional demand cannot be accommodated. During a time when one band may be fully utilized, there may be one or more similar adjacent bands that are underutilized or completely idle.

The spectrum brokering system 100 and/or the system 12, 12' or 12" may be used to change the manner in which the thin slivers of spectrum are used to create more value and new business opportunities for the spectrum holders. In one approach, slivers of spectrum that have been respectively allocated to a variety of holders may be aggregated to produce a wide spectrum band that has more value than the individual bands. At least a portion of the aggregated spectrum may be used by a service provider to provide a greater volume of service (e.g., service more voice calls at the same time than would be possible with a smaller portion of spectrum) and/or to provide additional services, such as video services. Furthermore, holders of spectrum that are not utilizing all or some of their spectrum may sublease their spectrum for profit or some other benefit.

An exemplary implementation will be described with reference to a hypothetical group of UHF and/or VHF spectrum users located in a common geographic area. It will be appreciated that these concepts have application outside the UHF and/or VHF bands. In the example, there may be many holders of spectrum that each has a small band of the UHF and/or VHF frequencies. These bands typically have bandwidths of less than 50 kilohertz (KHz). For simplicity, it will be assumed that each band in the example has a bandwidth of 25 KHz and that each holder holds a single band (sometimes referred to as a channel). In the example, the holders are licensees and may include, but are not limited to, a taxi dispatch service, a delivery service, a building contractor and a municipal workforce. Using their respective bands, each exemplary license holder may run a push-to-talk service for a relatively small number of users. Depending on the size of the geographic area and licensing regulations, these UHF and/or VHF bands may be utilized with a single base station transceiver.

For purposes of aggregating spectrum, these exemplary license holders may join together in a cooperative fashion to formulate a band that could be more than 1 megahertz (MHz) wide. The incentive to aggregate spectrum in this manner may be to achieve a common goal, such as providing a municipal wireless network for residents and businesses, provide a municipal service and/or to generate revenue.

In practice, the holders may contribute their respective spectrum bands to the broker system that would treat the collection as a single monolithic block of spectrum for distribution in an efficient and effective manner. It is noted that this block of spectrum may or may not be continuous or contiguous.

Figure 14:
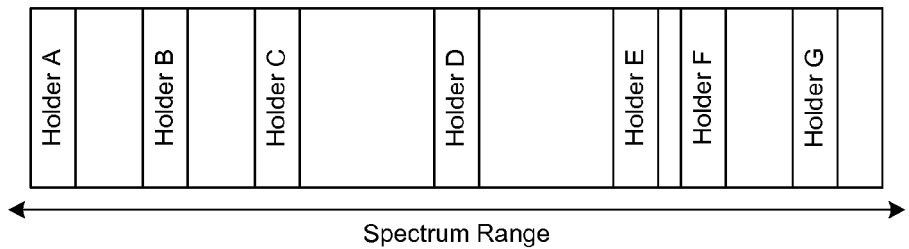
FIG. 14 is a schematic representation of a typical spectrum allocation under historical spectrum allocation techniques.

With additional reference to FIG. 14, illustrated is how several users (e.g., holders A through G) might use spectrum as allocated in the historical manner. In this dedicated spectrum example, it may be observed that much of the spectrum is not utilized and the allocated bands are in arbitrary and/or small fragments.

Figure 15:
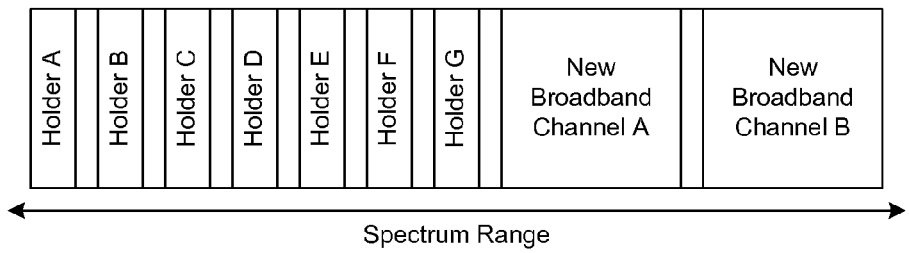
FIG. 15 is a schematic representation of a spectrum allocation using a brokered approach.

With additional reference to FIG. 15, illustrated is the same portion of spectrum that is illustrated in FIG. 14 and that has been reallocated by the broker system 106. As illustrated, each spectrum holder retains a portion of spectrum for their continued use, and one or more wider portions of spectrum are made available for other services, such as wideband networking, video surveillance and so forth. In one embodiment, the spectrum has been allocated using a virtual channel approach, rather than fix channels that are inefficiently allocated. The allocation established by the broker system 106 may be dynamic and may be re-allocated based on use and/or demand.

In one embodiment, the spectrum holders have joined together as a cooperative. But it is possible that financial incentives may drive participation in the aggregation of spectrum. For instance, a user may be willing to financially compensate the spectrum holders for use of a broadband channel.

E(8). Example System Environment

Metropolitan Broadband Application

Recently, municipal or metro-wide broadband wireless networks have been proposed to compete with traditional landline telephone companies, cellular telephone companies and cable internet services. The service providers behind such efforts have been local governments, small scale companies functioning as wireless Internet service providers (WISPs), and large companies such as America Online (AOL), Google and EarthLink. The aim of these entities is often to provide low-cost or free broadband Internet access to residents and enterprises in the target geographic area. However, the entities attempting to establish such networks typically do not hold sufficient wireless spectrum, if any. Attempting to acquire spectrum licenses may be prohibitively expensive. Accordingly, many of these networks are being deployed in an unlicensed band, such as the 2.4 GHz unlicensed band known as the second ISM band.

Service providers in unlicensed bands are forced to compete with a wide range of existing wireless systems and devices that inhabit the band or that may come into the band in the future. The competing systems and devices include, but are not limited to, microwave ovens, cordless telephones, local 802.11b/g WiFi networks, and Bluetooth enabled devices. The combination of interference created by these systems and devices as well as the propagation characteristics at 2.4 GHz may make deployment of a wireless network challenging. Also, to get adequate coverage and in-building signal penetration, the number of base stations or access points per square mile may need to be high enough that deployment is uneconomical.

The spectrum brokering system 100 and/or the system 12, 12' or 12" may be used to provide a source of cost-effective spectrum to fill the objectives of an entity attempting to establish a broadband wireless network. In one embodiment, the spectrum used for the broadband wireless network may be less than 1 GHz, which may provide good in-building signal penetration. However, almost all of the spectrum under 1 GHz has been allocated and any spectrum that is available under 1 GHz is typically found in relatively narrow bands that are not suitable for broadband applications. For instance, if it is assumed that a fairly efficient modulation scheme of one bit per hertz (1 bit/hertz) is used, than about 5 MHz or more spectrum would be desirable.

Even though there is allocation of spectrum under 1 GHz, there may be a suitable amount of spectrum that is underutilized and that may be made available under a brokerage scheme to use for a broadband wireless network that covers a specified geographic area. For example, large portions of the 900 MHz cellular bands and the 800 MHz trunking bands are rarely used even though they are held by private entities, such as low-power television licenses, or the national telecommunications and information administration (NTIA). These spectrum holders are typically reluctant to give up their spectrum in case they find a future use for the spectrum. But under a brokerage system the spectrum holders may be willing to share spectrum. It is also contemplated that spectrum may be made available for a broadband wireless network from a cooperative of smaller license holders in similar manner to the example system environment described above.

In one embodiment, between about 20 MHz and about 80 MHz of spectrum may be provided for the wireless network. With this amount of spectrum, end user devices, base stations and access points may be implemented with off-the-shelf technology, such as WiFi radius or WiMax radius. Off-the-shelf technology for these devices may reduce deployment costs and end-user costs. Also, reasonably high-powered transmitters (e.g., in the range of about 500 milliwatts (mW) to about 1 Watt (W)) may be used to establish good in-building penetration and coverage with an economically reasonable number of base stations or access points per square mile. It is noted that current FCC rules regarding secondary use may not permit such high-power devices or such types of network deployment. But it may be expected that FCC rules could be modified in this area. Another potential secondary use option would be ultra-wideband (UWB) technology, which is permitted at very low power so as to limit the effective range to about 10 meters.

In one embodiment, WiFi or WiMax technology combined with cooperation from a license holder may be used to economically deploy a wireless network across a geographic area using the spectrum brokering system 100 and/or the system 12, 12' or 12". In one embodiment, the license holder could be a commercial entity, such as the holder of a 700 MHz television license or a government entity (e.g., NTIA). Exemplary candidate spectrum ranges include the 300 MHz to 400 MHz range held by the government, or the 698 MHz to 794 MHz range primarily used for television broadcasting.

In one embodiment, the service provider of the wireless network may enter into an agreement with the license holder or holders for a secondary use of the spectrum. The system would provide spectrum certificates to allow operation of the wireless network. System sensors (e.g., spectrum sniffers) or radios operating within the system may be used as part of a policing function to minimize transmissions falling outside a predetermined boundary and to minimize interference of network operation with use by the primary license holder(s). The spectrum holder may regain control of its spectrum in an orderly manner by slowly reducing the number and/or type of certificates issued to the service provider of the wireless network.

An exemplary implementation will be described where NTIA offers spectrum. The spectrum held by NTIA is typically only needed in an emergency. The spectrum made available for the secondary use may be returned to NTIA if an emergency arises or may be returned over time in a particular geographic area. For instance, if spectrum certificates are issued for a duration less than the timeframe that it may take to return all or part of the spectrum, then the service provider may release the spectrum in an emergency situation. It may be noted that very few emergencies are nationwide. Therefore, an incident that leads to the return of spectrum may have a localized impact on the wireless network. In the event of an emergency during which spectrum may need to be returned, the service provider may establish a backup plan to allow for limited wireless network service to continue until the end of the emergency situation. The backup plan may include accessing alternative spectrum from another spectrum holder. This alternative spectrum may have a higher cost than the spectrum provided by the NTIA. Another backup plan may include using spectrum in an unlicensed band, such as the 900 MHz ISM band.

It is noted that the wireless network may be deployed without excessive use of spectrum. For example, under the current IEEE standard definition for WiFi technology, channels as narrow as 10 MHz may be used. Also, WiMax may operate in 2*1.75 megahertz channels or more.

The use of spectrum currently held by spectrum licensees or the government (e.g., through an agency such as the FCC or NTIA) could stimulate a number of WiSPs or other services. Soon use would not be constrained to unlicensed spectrum and would not be forced to tolerate significant and growing interference found in unlicensed bands. Licensed spectrum, in comparison, would have little or no interference. Costs to the spectrum holder to acquire a secondary use rights would likely be much less than the cost to acquire spectrum holdership. In mid-2007, the cost for spectrum is about $150 million per megahertz. Assuming that the FCC, the NTIA and/or spectrum holders were to share spectrum in the described manner, the spectrum can be purchased as a commodity in relatively small, granular amounts that are based on geographic location, frequency and time. Thus, new services may be launched in a cost effective manner and the government and/or spectrum holders would be in a position to receive value in return for the spectrum. As a result, the spectrum could become more profitable for the government while new approaches to using spectrum would be encouraged. The spectrum use applications that commercially succeed could grow and generate more revenue as spectrum demand grows. Conversely, unsuccessful spectrum use applications would terminate without continuing restrictions on spectrum.

E(9). Example System Environment

Spectrum Brokering and Exchange Wireless Network

As spectrum becomes an increasingly more valuable asset, brokering spectrum may become a vehicle to extract value from underutilized spectrum. Also, existing and new wireless network applications may begin to take advantage of spectrum availability. Under this implementation, wireless networks may be designed to use spectrum on a leased basis in one or more frequency bands in which existing holders have offered the spectrum for use and/or for which a regulatory body has allowed secondary use of designated spectrum. Conditions on the use of spectrum may be imposed. These conditions may include guidelines established by the spectrum holder and/or regulatory rules. To maximize compliance with the conditions, monitoring of the spectrum may be made. A method of monitoring spectrum may include using RF sensors that are deployed over a geographic area. The RF sensors may be used to measure the power levels of RF transmissions.

The data collected by the RF sensors may be analyzed and used to automatically correct a wireless network to maximize compliance with the conditions. Additionally, the sensors may be used by the wireless network service providers to ascertain and/or predict coverage area of the wireless network. This information may be used to effectively manage assets and clients within the network to save money and time in deployment and maintenance activities. In addition to or instead of deployed sensors, radios used for wireless communication within the network may be to collect spectrum usage information for these compliance enforcement and network management functions.

Figure 16:
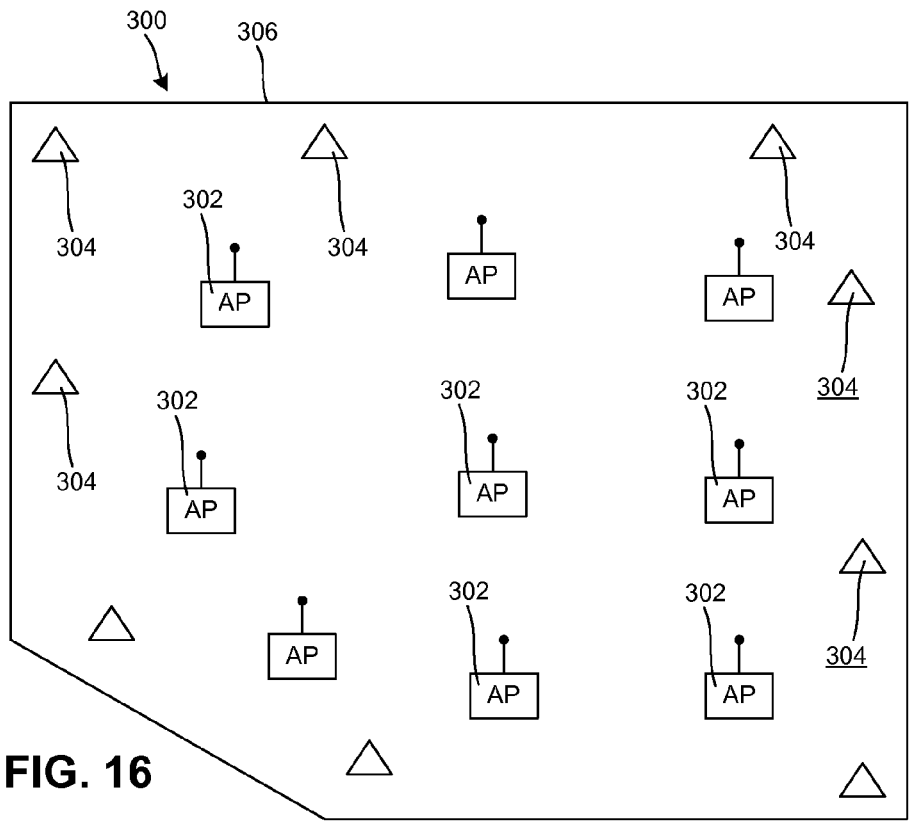
FIG. 16 is a schematic diagram of a wireless network.

With additional reference to FIG. 16, a wireless network 300 is shown. The wireless network 300 may include access points 302 for providing service to client devices (not shown). In addition to or instead of the access points 302, base stations or other network access radios may be deployed. The wireless network 300 also may include sensors 304 that form a sensor network.

The access points 302 may be deployed such that the corresponding antenna pattern reaches the extremes of a geographic coverage area 306 so that users of the network within the coverage area 306 may receive signals.

If the wireless network 300 uses leased spectrum or secondary use spectrum, the coverage area 306 may be defined by the prevailing lease or leases as set forth in spectrum certificates, for example. If the wireless network 300 exceeds permissible boundaries by transmitting RF energy beyond the boundaries the wireless network 300 may be considered to be in violation of the terms of the lease. Potential penalties may be imposed for such a violation.

The sensors 304 may be deployed at the edges of the coverage area 306. In this manner, the spectrum holder(s) and/or a service provider of the wireless network 300 may monitor RF energy levels from network components, such as the access points 302, the client devices and other RF transmitters. An analysis may be made based on the data collected from the sensors 304 to determine how far the RF transmissions are traveling and the frequency of the transmissions. The data also may be compared to the guidelines, the rules, and the rights of the transmitter. If a violation is detected, the wireless network 300 may inform the transmitter. Additional or alternative remedial action may be taken, such as automatically reducing the power levels of one or more of the transmitters, changing the antenna pattern and/or ceasing transmission from the violating source. The data from the sensors 304 may be analyzed by a server or centralized device that executes a program to carry out such functionality. The program may be in the form of software stored on a computer readable medium.

The sensor network may aid a wireless network service provider by determining coverage of the network throughout the coverage area 306. By measuring RF levels at the boundaries of the coverage area 306, the wireless network service provider may increase or decrease RF power of the various access points 302 and client devices. Also, using this information, antenna patterns may be changed to fill in areas where coverage may not be available.

F. CONCLUSION

Although certain embodiments have been shown and described, it is understood that equivalents and modifications falling within the scope of the appended claims will occur to others who are skilled in the art upon the reading and understanding of this specification.

What is claimed is:

1. A method of managing pool of spectrum for which wireless communications use rights in the spectrum are temporarily transferable from respective spectrum holders to spectrum users, comprising:

receiving over time, with an automated spectrum exchange server and from each of plural spectrum holders, a data set identifying unused or underutilized spectrum of the respective spectrum holder in a respective geographic region, the spectrum holders from which the data sets are received changing over time such that frequencies of spectrum in the pool change over time, a spectrum holder being a party that has authority to release use of the spectrum identified in the data set to another entity; and with the automated spectrum exchange server, forming a spectrum commodity item for each received data set to electronically describe spectrum identified in the data set, each spectrum commodity item describing respective spectrum in a predetermined and consistent format regardless of frequency and regulatory rules for using the spectrum for wireless communications, each spectrum commodity item including a time window, a frequency-based spectral mask, a geography-based emission mask and a transmitted power limit that correspond to available spectrum; and wherein the spectrum commodity items collectively form the pool of available spectrum for a dynamically changing group of spectrum users having diverse spectrum needs, the pool dynamically changing over time as the data sets are received over time and as spectrum corresponding to the spectrum commodity items is no longer available for use by the spectrum users and as spectrum corresponding to the spectrum commodity items are allocated for use by the spectrum users.

2. The method of claim 1, wherein the spectrum defined by at least one of the spectrum commodity items is disaggregated from other spectrum identified in the corresponding data set in at least one of time, frequency or geography.

3. The method of claim 1, wherein the spectrum defined by at least one of the spectrum commodity items is aggregated with available spectrum from another spectrum source.

4. The method of claim 1, wherein forming the spectrum commodity item includes establishing spectrum commodity item components that minimize interference from communication operations of the spectrum holder on a potential spectrum user of the spectrum associated with the spectrum commodity item.

5. The method of claim 1, wherein the unused or underutilized spectrum for a data set is identified by analyzing spectrum use data, the analyzing carried out predictively to identify spectrum that will be unused or underutilized in the future.

6. The method of claim 1, wherein the unused or underutilized spectrum for a data set is identified by analyzing spectrum use data and the spectrum use data is collected by deployed spectrum sensors in the geographic area.

7. The method of claim 6, wherein the sensors are deployed by the corresponding spectrum holder that has authority to release use of the identified spectrum to another entity.

8. The method of claim 6, wherein the sensors are deployed by a broker entity that runs the automated spectrum exchange server the automated spectrum exchange server allocating spectrum certificates that authorize use of spectrum associated with spectrum commodity items.

9. The method of claim 1, wherein the unused or underutilized spectrum for a data set is identified by analyzing spectrum use data and the spectrum use data is collected by radio devices that operate in the geographic area.

10. The method of claim 1, wherein spectrum associated with each spectrum commodity item is made available to one or more prospective spectrum user systems over the automated spectrum exchange.

11. The method of claim 10, wherein the spectrum for each spectrum commodity item is made available in the form of an offer for which a prospective spectrum user system of the available spectrum places a bid.

12. The method of claim 11, wherein the offer and the bid are associated with real currency or artificial currency values.

13. The method of claim 11, wherein the offer and the bid are associated with non-monetary values selected from at least one of priority of spectrum users or spectrum availability.

14. The method of claim 1, wherein the geography-based emission mask includes a geographical boundary that a radio operating in accordance with the geography-based emission mask is not permitted to transmit beyond in one of an absolute manner or a relative manner specified by a power value at a geographical location.

15. An automated spectrum exchange system that manages a pool of spectrum for which wireless communications use rights in the spectrum are temporarily transferable from respective spectrum holders of the spectrum to spectrum users, comprising:
a network interface over which data sets from each of plural spectrum holders are received over time, each data set identifying unused or underutilized spectrum of the respective spectrum holder in a respective geographic region, the spectrum holders from which the data sets are received changing over time such that frequencies of spectrum in the pool change over time, a spectrum holder being a party that has authority to release use of the spectrum identified in the data set to another entity; and
a processor configured to form a spectrum commodity item for each received data set to electronically describe spectrum identified in the data set, each spectrum commodity item describing respective spectrum in a predetermined and consistent format regardless of frequency and regulatory rules for using the spectrum for wireless communications, each spectrum commodity item including a time window, a frequency-based spectral mask, a geography-based emission mask and a transmitted power limit that correspond to available spectrum; and
wherein the spectrum commodity items collectively form the pool of available spectrum for a dynamically changing group of spectrum users having diverse spectrum needs, the pool dynamically changing over time as the data sets are received over time and as spectrum corresponding to the spectrum commodity items is no longer available for use by the spectrum users and as spectrum corresponding to the spectrum commodity items are allocated for use by the spectrum users.

16. The system of claim 15, wherein the spectrum defined by at least one of the spectrum commodity items is disaggregated from other spectrum identified in the corresponding data set in at least one of time, frequency or geography.

17. The system of claim 15, wherein the spectrum defined by at least one of the spectrum commodity items is aggregated with available spectrum from another spectrum source.

18. The system of claim 15, wherein forming the spectrum commodity item includes establishing spectrum commodity item components that minimize interference from communication operations of the spectrum holder on a potential spectrum user of the spectrum associated with the spectrum commodity item.

19. The system of claim 15, wherein the unused or underutilized spectrum for a data set is identified by analyzing spectrum use data, the analyzing carried out predictively to identify spectrum that will be unused or underutilized in the future.

20. The system of claim 15, wherein the unused or underutilized spectrum for a data set is identified by analyzing spectrum use data and the spectrum use data is collected by deployed spectrum sensors in the geographic area.

21. The system of claim 20, wherein the sensors are deployed by the corresponding spectrum holder that has authority to release use of the identified spectrum to another entity.

22. The system of claim 20, further comprising the spectrum sensors.

23. The system of claim 15, wherein the unused or underutilized spectrum for a data set is identified by analyzing spectrum use data and the spectrum use data is collected by radio devices that operate in the geographic area.

24. The system of claim 15, wherein spectrum associated with each spectrum commodity item is made available to one or more prospective spectrum user systems over the automated spectrum exchange system.

25. The system of claim 24, wherein the spectrum for each spectrum commodity item is made available in the form of an offer for which a prospective spectrum user system of the available spectrum places a bid.

26. The system of claim 25, wherein the offer and the bid are associated with real currency or artificial currency values.

27. The system of claim 25, wherein the offer and the bid are associated with non-monetary values selected from at least one of priority of spectrum users or spectrum availability.

28. The system of claim 15, wherein the geography-based emission mask includes a geographical boundary that a radio operating in accordance with the geography-based emission mask is not permitted to transmit beyond in one of an absolute manner or a relative manner specified by a power value at a geographical location.

* * * * *